United States Patent

Kataoka et al.

[11] Patent Number: 5,945,366
[45] Date of Patent: Aug. 31, 1999

[54] SOLID CATALYST COMPONENT FOR POLYMERIZATION OF OLEFINS AND CATALYST

[75] Inventors: Takuo Kataoka; Hidetoshi Umebayashi; Kenji Goto, all of Kanagawa, Japan

[73] Assignee: Toho Titanium Co., Ltd., Chigasaki, Japan

[21] Appl. No.: 08/817,171

[22] PCT Filed: Aug. 21, 1996

[86] PCT No.: PCT/JP96/02336

§ 371 Date: Apr. 21, 1997

§ 102(e) Date: Apr. 21, 1997

[87] PCT Pub. No.: WO97/07142

PCT Pub. Date: Feb. 27, 1997

[30] Foreign Application Priority Data

Aug. 21, 1995 [JP] Japan .................................... 7-234695
Nov. 24, 1995 [JP] Japan .................................... 7-329874

[51] Int. Cl.$^6$ .............................. B01J 31/00; B01J 37/00
[52] U.S. Cl. ........................ 502/127; 502/110; 502/114; 502/115; 502/116; 502/125; 502/132; 502/133; 526/119; 526/128; 526/14.4
[58] Field of Search .................... 502/110, 114, 502/115, 116, 125, 127, 132, 133

[56] References Cited

U.S. PATENT DOCUMENTS

| | | | |
|---|---|---|---|
| 3,987,233 | 10/1976 | Sato et al. ............................ | 502/133 |
| 4,451,688 | 5/1984 | Kuroda ................................. | 502/116 |
| 4,497,906 | 2/1985 | Hanji et al. .......................... | 502/110 |
| 4,547,476 | 10/1985 | Terano et al. ....................... | 502/127 |
| 4,816,433 | 3/1989 | Terano et al. ....................... | 502/127 |
| 4,829,037 | 5/1989 | Terano et al. ....................... | 502/125 |
| 4,839,321 | 6/1989 | Murai et al. ......................... | 502/133 |
| 4,927,797 | 5/1990 | Ewen .................................... | 502/125 |
| 5,104,837 | 4/1992 | Hawley ................................ | 502/133 |
| 5,547,912 | 8/1996 | Kataoka et al. .................... | 502/115 |
| 5,608,018 | 3/1997 | Ebara et al. ......................... | 502/116 |

FOREIGN PATENT DOCUMENTS

| | | |
|---|---|---|
| 0 665 243 | 8/1995 | European Pat. Off. . |
| 62-508 | 1/1987 | Japan . |
| 62-158704 | 7/1987 | Japan . |
| 63-301 | 1/1988 | Japan . |
| 8-67711 | 3/1996 | Japan . |

Primary Examiner—Mark L. Bell
Assistant Examiner—J. Pasterczyk
Attorney, Agent, or Firm—Oblon, Spivak, McClelland, Maier & Neustadt, P.C.

[57] ABSTRACT

A solid catalyst component (A1) for polymerization of olefins prepared by contact with a solid component (d) obtained by allowing (1) a solid component (a) obtained by allowing (i) a dialkoxymagnesium or diaryloxymagnesium, (ii) a titanium compound and (iii) a diester of aromatic dicarboxylic acid to come in contact with one another and (2) a solid component (b) obtained by allowing (i) a dialkoxymagnesium or diaryloxymagnesium, (ii) a titanium compound, (iii) a diester of aromatic dicarboxylic acid and (iv) a polysiloxane to come in contact with one another, to come in contact with each other, or a solid catalyst component (A2) for polymerization of olefins prepared by allowing said solid component (a) and (3) a solid component (d) obtained by allowing (i) a dialkoxymagnesium or diaryloxymagnesium, (ii) a titanium compound, (iii) a diester of aromatic dicarboxylic acid, (iv) a polysiloxane and (v) an aluminum compound to come in contact with one another, to come in contact with each other. Optionally, an organic aluminum compound (B) and organic silicon compound (C) can also be co-reacted to form the catalyst.

8 Claims, 2 Drawing Sheets

(A) TRANSITION METAL COMPONENT (B) ORGANIC METAL COMPONENT

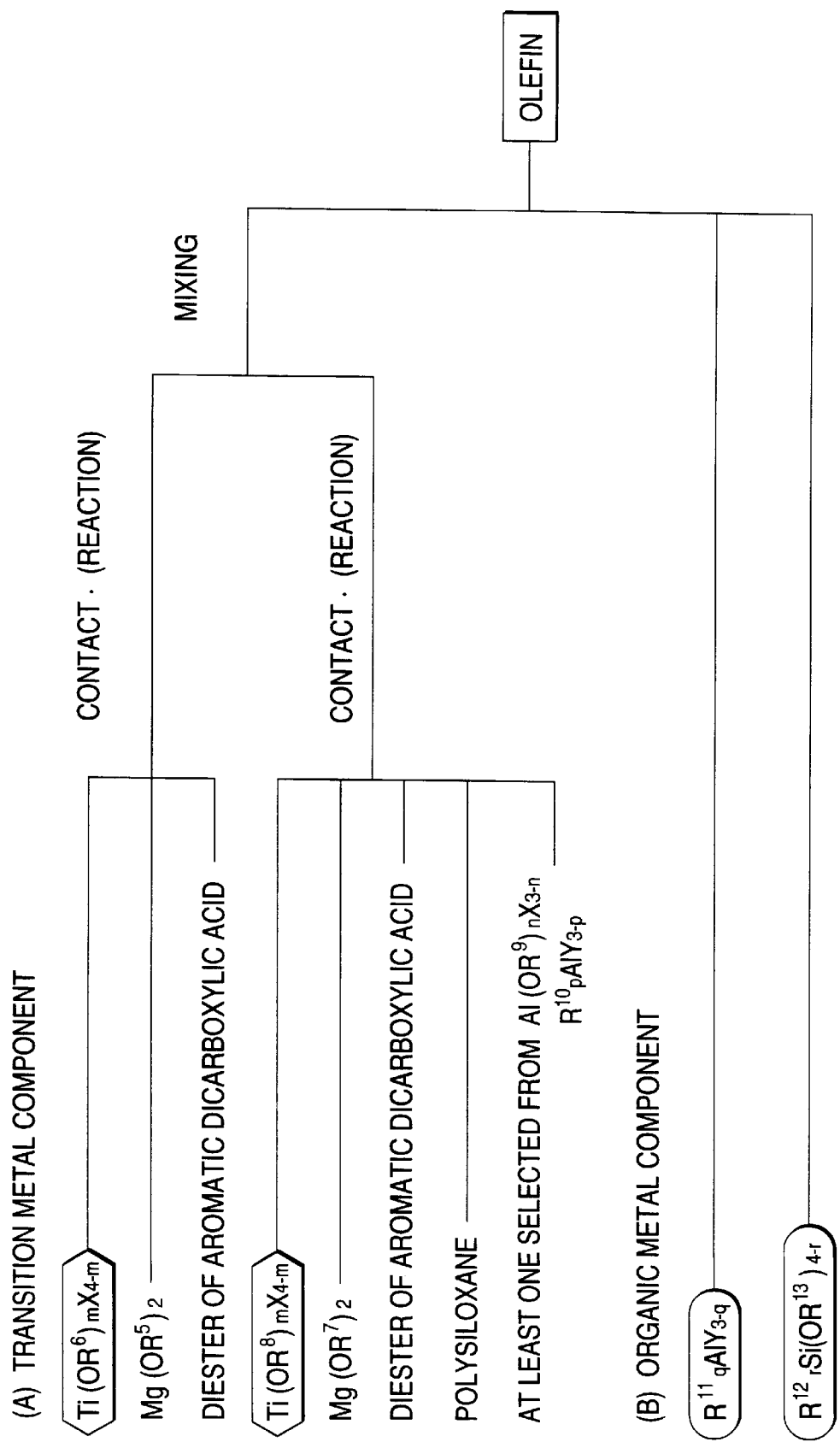

SOLID CATALYST COMPONENT FOR POLYMERIZATION OF OLEFINS AND CATALYST

TECHNICAL FIELD

The present invention relates to a solid catalyst component for polymerization of olefins and a catalyst for polymerization of olefins prepared from said solid catalyst component. More particularly, the present invention relates to a solid catalyst component for polymerization of olefins and a catalyst which exhibit an excellent polymerization activity when used for the polymerization of propylene and can provide a polymer having the desired stereoregularity or crystallinity stably in a high yield without changing the polymerization parameter and can easily control the stereoregularity or crystallinity of the polymer thus prepared.

TECHNICAL BACKGROUND

Many proposals have been made and known for a solid catalyst component comprising a titanium halide compound, a magnesium compound and an electron donor compound as essential components and a process for the polymerization of olefins in the presence of a catalyst comprising said solid catalyst component, an organic aluminum compound and a third component such as a silicon compound.

Further, a solid catalyst component prepared from a dialkoxymagnesium and titanium tetrachloride as main starting materials and a catalyst for polymerization of olefins made of said solid catalyst component, an organic aluminum compound and a third component such as a silicon compound have been known as disclosed in JP-A-63-3010 (The term "JP-A" as used herein means an "unexamined published Japanese patent application"), JP-A-1-221405, JP-A-1-315406, JP-A-3-227309, JP-A-3-70711, JP-A-4-8709, and many other references.

On the other hand, various proposals have been made for a solid catalyst component comprising a halogenated aluminum compound, a magnesium compound and halogenated titanium compound as essential components and a catalyst for polymerization of olefins made of said solid catalyst component, an organic aluminum compound and a third component such as an organic acid ester or silicon compound. For example, JP-A-55-161807 proposes a composition obtained by a process which comprises co-grinding magnesium chloride, an organic acid ester, a halogenated hydrocarbon compound and a halogenated aluminum compound, and then subjecting the mixture to heat treatment with titanium tetrachloride. The above cited publication also proposes a catalyst formed by an organic aluminum compound and an organic acid ester. JP-A-61-31402 discloses a catalyst made of a solid catalyst component obtained by a process which comprises reacting a reaction product of a halogenated aluminum compound and a silicon compound with a magnesium compound, and then reacting the reaction product with a halogenated titanium compound and a phthalic acid ester, an organic aluminum compound and silicon compound.

Moreover, various proposals have been made for a solid catalyst component comprising an alkoxyaluminum compound, a magnesium compound and a halogenated titanium compound as essential constitution components and a catalyst for polymerization of olefins made of said solid catalyst component, an organic aluminum compound and a third component such as an organic acid ester or silicon compound. For example, JP-A-57-145104 proposes a catalyst component obtained by a process which comprises co-grinding magnesium chloride, an organic acid ester and an alkoxyaluminum compound, and then subjecting the mixture to heat treatment with titanium tetrachloride. JP-A-1-245002 discloses a catalyst made of a solid catalyst component obtained by a process which comprises bringing a diethoxymagnesium and titanium tetrachloride into contact with each other, adding a trialkoxyaluminum to the mixture, and then reacting the mixture with phthalic acid dichloride, an organic aluminum compound and an epoxy p-methane compound.

The foregoing various techniques focus on the development of a catalyst component which is active enough to allow the omission of a so-called deashing step, i.e., step of removing catalyst residues such as chlorine and titanium remaining in the polymer produced by the polymerization of propylene in the presence of a catalyst as well as on the enhancement of the yield of stereoregular polymer or the durability of the polymerization activity. These techniques can provide excellent results on these purposes.

However, if the catalysts prepared according to the foregoing prior art techniques are employed for the production of a polymer which requires close control over stereoregularity or crystallinity such as film grade polymer, the stereoregularity or crystallinity must be controlled by changing the ratio of titanium contained in a solid catalyst component and an external electron donor such as organic silicon compound during polymerization. In the polymerization of propylene, the stereoregularity or crystallinity must be controlled by adding a small amount of a comonomer such as ethylene. However, the variation of the ratio of titanium and external electron donor is limited to the critical point within some range, making it difficult to control the stereoregularity or crystallinity of the polymerization product and hence making it very difficult to stably produce a polymer having less varied desired physical properties. On the other hand, if a small amount of a comonomer is added, the content of the comonomer can be hardly controlled. Further, the polymerization of two monomers requires a very intricate process. Moreover, the stereoregularity or crystallinity of the polymerization product can be controlled by lowering the polymerization temperature. However, this approach is disadvantageous in that the yield of polymer produced is reduced.

Thus, the prior art techniques have never made clear any high activity type solid catalyst component and catalyst which can easily and stably provide a polymer having required stereoregularity or crystallinity without any intricate procedures.

If the stereoregularity or crystallinity of the polymer in the polymerization of propylene is controlled in the presence of the foregoing high activity type catalyst, it is difficult to obtain a polymer having the desired stereoregularity or crystallinity stably with little variation. If olefins, particularly propylene, are polymerized by a slurry process in the presence of the foregoing high activity type catalyst, a polymer can be produced in a high yield and with a better stereoregularity than in the polymerization in the presence of the conventional catalyst formed by a titanium trichloride type solid catalyst component, an organic aluminum compound and a third component such as an electron donor compound. At the same time, however, the polymer thus obtained tends to exhibit a higher crystallinity than obtained in the conventional catalyst. This causes some troubles. For example, the polymer thus obtained can be broken when formed at a high speed during working into film or sheet. Further, the formed products thus obtained exhibit an impaired transparency.

In order to solve the foregoing problems, if the foregoing high activity type catalyst is used for the polymerization of olefins, in particular propylene, the lowering of the polymerization temperature or the presence of a small amount of ethylene as a comonomer can be attempted. In this manner, the stereoregularity or crystallinity of the polymer thus produced can be somewhat controlled. However, this induces desirable phenomena. For example, in the case of slurry polymerization, the percent occurrence of a low molecular polymer soluble in the polymerization solvent is raised. In particular, in the polymerization of propylene, the percent occurrence of atactic polypropylene, which has an extremely low stereoregularity, is raised.

If the percent occurrence of atactic polypropylene is raised in slurry polymerization, an extraction step is required after separating the particles of polymer product from the polymerization solvent. This also disadvantageously contaminates the reactor or piping. Thus, this causes problems in production cost and stable operation. Further, if a variety of grades of polymers are produced in one plant, it finds difficulty in controlling the quality of products over the variation of operation conditions in continuous operation, giving undesirable effects on the process operation.

Moreover, if a polymerization catalyst having a composition comprising this kind of a high activity type catalyst component, an organic aluminum compound and an electron donor compound such as silicon compound is employed to polymerize olefins, the polymer thus produced contains much fines derived from fines of solid catalyst component itself or obtained by fragmentation due to reaction heat during polymerization. Thus, the polymer has a broad particle size distribution. As a result, the bulk density of the polymer thus produced tends to drop. If the content of the fine polymer is raised, the continuance of uniform reaction can be inhibited. Further, the pipe in the polymerization process can be blocked. Moreover, some troubles can occur at the separation step and the drying step of the polymer thus produced. It has been desired to solve these problems. In addition, if the particle size distribution is widened, it eventually gives undesirable effects on the molding of the polymer. If the bulk density of the polymer thus produced is lowered, the resulting productivity is extremely lowered. This is the reason why a polymer having as small fine polymer content as possible and a high bulk density has been desired.

In order to solve these problems, JP-A-6-157659 proposes a catalyst for polymerization of olefins made of a solid catalyst component obtained by a process which comprises adding a suspension of a spherical particulate dialkoxymagnesium, an aromatic hydrocarbon and a diester of phthalic acid to a mixture of an aromatic hydrocarbon and titanium tetrachloride so that they are reacted, and then reacting the reaction product with titanium tetrachloride.

Further, JP-A-6-287225 proposes a solid catalyst component for polymerization of olefins obtained by a process which comprises adding a suspension of a spherical particulate dialkoxymagnesium, an aromatic hydrocarbon and a diester of phthalic acid to a mixture of an aromatic hydrocarbon and titanium tetrachloride so that they are reacted, washing the reaction product with an aromatic hydrocarbon, and then again reacting the reaction product with titanium tetrachloride to obtain a solid component which is then dried and freed of fine powder.

On the other hand, JP-A-6-287217 proposes a solid catalyst component for polymerization of olefins obtained by a process which comprises adding a suspension of a spherical particulate dialkoxymagnesium, an aromatic hydrocarbon and a diester of phthalic acid to a mixture of an aromatic hydrocarbon and titanium tetrachloride so that they are reacted, washing the reaction product with an aromatic hydrocarbon, again reacting the reaction product with titanium tetrachloride, drying the solid component thus obtained, removing fine powder from the solid component, and then adding a powdered nonionic surface active agent to the solid component.

The foregoing technique can remove the fine powder derived from the solid catalyst component itself, eventually exerting an effect of reducing the content of fine powder in the polymer thus produced. However, the effect of the foregoing technique does not go so far as to control the generation of fine powder due to fragmentation of particles by the reaction heat during polymerization, in particular in the initial stage of the polymerization reaction. Thus, a fine powder is still present in the polymer thus produced.

Further, the polymer produced according to the foregoing technique has a good morphology but has a low bulk density. In the production of a polyolefin, the amount of a polymer to be produced per unit volume in the polymerization tank is reduced, and the amount of the polymer to be processed during transportation or pelletizing step is limited. As a result, the productivity throughout the entire process for the production of polyolefin is reduced. Further, even if a polymer having a relatively high bulk density can be obtained, the problem of drop of polymerization activity or stereoregularity is left unsolved.

The present invention has been worked out as a result of intensive studies of the solution to the problems of the prior art problems. An object of the present invention is to provide a solid catalyst component for polymerization of olefins and a catalyst which can stably provide a polymer having the desired stereoregularity and crystallinity without changing the polymerization parameter when used in the polymerization of olefins, in particular propylene, can easily control the stereoregularity or crystallinity of the polymer thus produced and can provide a stereoregular polymer in a high yield with a reduced percent occurrence of atactic polypropylene even if a polymer having a relatively low crystallinity is produced, in particular, by subjecting propylene to slurry polymerization. Another object of the present invention is to provide a solid catalyst component for polymerization of olefins and a catalyst which can provide a polymer having a high bulk density and a small content of fine powder while maintaining its high polymerization activity and keeping the yield of highly stereoregular polymer high.

DISCLOSURE OF THE INVENTION

In order to accomplish the foregoing objects of the present invention, the present invention has the following aspects.

1. A solid catalyst component for polymerization of olefins (hereinafter referred to as "solid catalyst component (A1)"), comprising in combination one or more solid components (a) defined in the following clause (1) and one or more solid components (b) defined in the following clause (2):

(1) Solid component (a) prepared from the following components (a1) to (a3):

(a1) One or more dialkoxymagnesiums or diaryloxymagnesiums represented by the general formula [I]:

$$Mg(OR^1)_2 \qquad [I]$$

wherein $R^1$ represents a $C_{1-4}$ alkyl or aryl group;

(a2) One or more titanium compounds represented by the general formula [II]:

$$Ti(OR^2)_m X_{4-m} \quad [II]$$

wherein $R^2$ represents a $C_{1-4}$ alkyl group; X represents a halogen atom; and m represents 0 or an integer of from 1 to 3; and (a3) One or more diesters of aromatic dicarboxylic acid; and (2) Solid component (b) prepared from the following components (b1) to (b4):

(b1) One or more dialkoxymagnesiums or diaryloxymagnesiums represented by the general formula [III]:

$$Mg(OR^3)_2 \quad [III]$$

wherein $R^3$ represents a $C_{1-4}$ alkyl or aryl group;

(b2) One or more titanium compounds represented by the general formula [IV]:

$$Ti(OR^4)_m X_{4-m} \quad [IV]$$

wherein $R^4$ represents a $C_{1-4}$ alkyl group; X represents a halogen atom; and m represents 0 or an integer of from 1 to 3;

(b3) One or more diesters of aromatic dicarboxylic acid; and (b4) One or more polysiloxanes.

2. The solid catalyst component (A1) as defined in the foregoing aspect 1, wherein the weight ratio of solid component (a) to solid component (b) is from 1:99 to 99:1.

3. A solid catalyst component for polymerization of olefins (hereinafter referred to as "solid catalyst component (A2)"), comprising in combination one or more solid components (c) defined in the following clause (1) and one or more solid components (d) defined in the following clause (2):

(1) Solid component (c) prepared from the following components (c1) to (c3):

(c1) One or more dialkoxymagnesiums or diaryloxymagnesiums represented by the general formula [V]:

$$Mg(OR^5)_2 \quad [V]$$

wherein $R^5$ represents a $C_{1-4}$ alkyl or aryl group;

(c2) One or more titanium compounds represented by the general formula [VI]:

$$Ti(OR^6)_m X_{4-m} \quad [VI]$$

wherein $R^6$ represents a $C_{1-4}$ alkyl group; X represents a halogen atom; and m represents 0 or an integer of from 1 to 3; and (c3) One or more diesters of aromatic dicarboxylic acid; and (2) Solid component (d) prepared from the following components (d1) to (d5):

(d1) One or more dialkoxymagnesiums or diaryloxymagnesiums represented by the general formula [VII]:

$$Mg(OR^7)_2 \quad [VII]$$

wherein $R^7$ represents a $C_{1-4}$ alkyl or aryl group;

(d2) One or more titanium compounds represented by the general formula [VIII]:

$$Ti(OR^8)_m X_{4-m} \quad [VIII]$$

wherein $R^8$ represents a $C_{1-4}$ alkyl group; X represents a halogen atom; and m represents 0 or an integer of from 1 to 3;

(d3) One or more diesters of aromatic dicarboxylic acid;

(d4) One or more polysiloxanes; and (d5) One or more compounds selected from the group consisting of aluminum compounds represented by the general formula [IX]:

$$Al(OR^9)_n X_{3-n} \quad [IX]$$

wherein $R^9$ represents a $C_{1-4}$ alkyl or aryl group; X represents a halogen atom; and n represents a real number of from at least 0 to not more than 3 or the general formula [X]:

$$R^{10}_p AlQ_{3-p} \quad [X]$$

wherein $R^{10}$ represents a $C_{1-4}$ alkyl group; Q represents a hydrogen atom or halogen atom; and p represents a real number of from more than 0 to not more than 3.

4. The solid catalyst component (A2) as defined in the foregoing aspect 3, wherein the weight ratio of solid component (c) to solid component (d) is from 1:99 to 99:1.

5. A catalyst for polymerization of olefins formed by the following components (A), (B) and (C):

(A) Solid catalyst component as defined in any one of the foregoing aspects 1 to 4;

(B) Organic aluminum compound represented by the general formula [XI]:

$$R^{11}_q AlQ_{3-q} \quad [XI]$$

wherein $R^{11}$ represents a $C_{1-4}$ alkyl group; Q represents a hydrogen atom or halogen atom; and q represents a real number of from more than 0 to not more than 3; and (C) Organic silicon compound represented by the general formula [XII]:

$$R^{12}_r Si(OR^{13})_{4-r} \quad [XII]$$

wherein $R^{12}$ represents the same or different $C_{1-12}$ alkyl, cycloalkyl, phenyl, vinyl, allyl or aralkyl group; $R^{13}$ represents the same or different $C_{1-4}$ alkyl, cycloalkyl, phenyl, vinyl, allyl or aralkyl group; and r represents 0 or an integer of from 1 to 3.

BRIEF DESCRIPTION OF THE DRAWINGS

FIG. 2 is a flow chart illustrating another embodiment of the process for the production of the catalyst for polymerization of olefins according to the present invention.

BEST MODE FOR IMPLEMENTING THE INVENTION

[Solid catalyst component (A1)]

Figure 1:
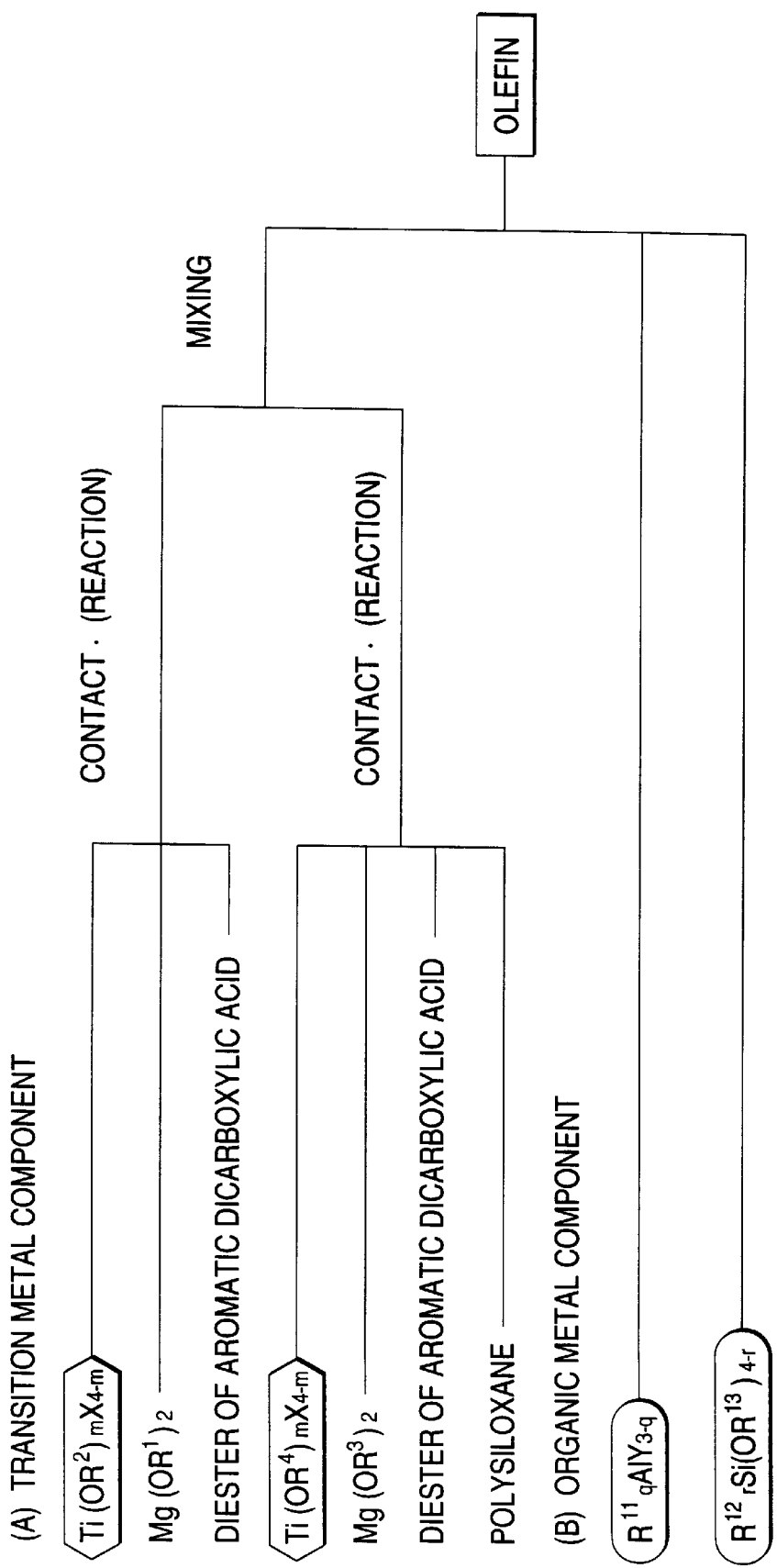
FIG. 1 is a flow chart illustrating an embodiment of the process for the production of the catalyst for polymerization of olefins according to the present invention.

Preferred examples of the dialkoxymagnesium or diaryloxymagnesium (hereinafter occasionally referred to as "component (a1)") represented by the general formula [I]: $Mg(OR^1)_2$ (wherein $R^1$ represents a $C_{1-4}$ alkyl or aryl group) to be used in the preparation of the solid component (a) constituting the solid catalyst component (A1) of the present invention (hereinafter occasionally referred to as "component (A1)") include dimethoxymagnesium, diethoxymagnesium, di-n-propoxymagnesium, di-iso-propoxymagnesium, di-n-butoxymagnesium, di-iso-butoxymagnesium, diphenoxymagnesium, ethoxymethoxymagnesium, ethoxy-n-propoxymagnesium, n-butoxyethoxymagnesium, and iso-butoxyethoxymagnesium. Particularly preferred among these dialkoxymagnesiums or diaryloxymagnesiums is diethoxymagnesium or di-n-propoxymagnesium.

The foregoing dialkoxymagnesium or diaryloxymagnesium may be used in granular or powder form. The particle shape of the dialkoxymagnesium or diaryloxymagnesium may be amorphous or spherical. If a spherical particulate diethoxymagnesium or dialkoxymagnesium is used, a polymer powder having a better particle shape, a less content of fine powder and a narrower particle size distribution can be obtained. Thus, the polymer powder produced can be better handled during the polymerization, eliminating troubles such as blocking caused by the fine powder contained in the polymer powder produced.

The foregoing spherical particulate diethoxymagnesium or diaryloxymagnesium does not necessarily need to be round but may be ellipsoidal or pebble-like. In some detail, the sphericity of the particle is not more than 3, preferably from 1 to 2, more preferably from 1 to 1.5 as calculated in terms of ratio of major axis length l to minor axis length w (l/w).

Further, the foregoing particulate dialkoxymagnesium or diaryloxymagnesium may have an average particle diameter of from 1 μm to 200 μm, preferably from 5 μm to 150 μm. On the other hand, the foregoing particulate dialkoxymagnesium or diaryloxymagnesium has a specific surface area of from 5 to 50 m²/g, preferably from 10 to 40 m²/g, more preferably from 15 to 30 m²/g.

The foregoing spherical particulate dialkoxymagnesium or diaryloxymagnesium has an average particle diameter of from 1 μm to 100 μm, preferably from 5 μm to 50 μm, more from 10 μm to 40 μm. Further, referring to its particle size, the foregoing spherical particulate compound preferably has a sharp particle size distribution comprising less fine powder or coarse powder. In some detail, the particle size distribution comprises particles having a particle size of not more than 5 μm in an amount of not more than 20%, preferably not more than 10%, and particles having a particle size of at least 300 μm in an amount of not more than 10%, more preferably not more than 5%. The particle size distribution is not more than 5, preferably not more than 4, as calculated in terms of ln (D90/D10) (wherein D90 represents the particle diameter at the point where the accumulated particle size reaches 90% and D10 represents the particle diameter at the point where the accumulated particle size reaches 10%).

The spherical particulate dialkoxymagnesium or diaryloxymagnesium to be used normally has a bulk density of from 0.20 to 0.35 g/ml as determined according to JIS K6721. In general, if a solid catalyst component comprising a spherical particulate dialkoxymagnesium or diaryloxymagnesium having such a high bulk density is used to effect polymerization of olefins, a polymer having a higher bulk density can be obtained. In the present invention, even if the spherical particulate dialkoxymagnesium or diaryloxymagnesium to be used has a bulk density as relatively low as less than 0.25 g/ml, the bulk density of the polymer produced in the presence of a solid catalyst component comprising such a spherical particulate dialkoxymagnesium or diaryloxymagnesium is not lowered. Thus, a polymer having a high bulk density can be obtained.

The foregoing dialkoxymagnesium does not necessarily need to be used as a starting material in the preparation of the solid catalyst component (A1). For example, one obtained by the reaction of metallic magnesium with a $C_{1-4}$ aliphatic monohydric alcohol in the presence of a catalyst such as iodine may be used during the preparation of the solid catalyst component (A1).

The component (a2) to be used in the preparation of the solid component (a) constituting the solid catalyst component (A1) of the present invention is a titanium compound (hereinafter occasionally referred to as "component (a2)") represented by the general formula [II]: $Ti(OR^2)_m X_{4-m}$ (wherein $R^2$ represents a $C_{1-4}$ alkyl group; X represents a halogen atom; and m represents 0 or an integer of from 1 to 3). Examples of such a titanium compound include titanium halide and alkoxytitanium halide. Specific examples of the titanium tetrahalide include $TiCl_4$, $TiBr_4$, and $TiI_4$. Specific examples of the alkoxytitanium halide include $Ti(OCH_3)Cl_3$, $Ti(OC_2H_5)Cl_3$, $Ti(OC_3H_7)Cl_3$, $Ti(O-(n)C_4H_9)Cl_3$, $Ti(OCH_3)_2Cl_2$, $Ti(OC_2H_5)_2Cl_2$, $Ti(OC_3H_7)_2Cl_2$, $Ti(O-(n)C_4H_9)_2Cl_2$, $Ti(OCH_3)_3Cl$, $Ti(OC_2H_5)_3Cl$, $Ti(OC_3H_7)_3Cl$, and $Ti(O-(n)C_4H_9)_3Cl$. Preferred among these titanium compounds is titanium tetrahalide. Particularly preferred is $TiCl_4$. These titanium compounds may be used singly or in combination. The component (a2) may be dissolved in and diluted with an organic solvent such as aromatic hydrocarbon (e.g., toluene, xylene) and aliphatic hydrocarbon (e.g., hexane, heptane) before use. The titanium halide as the component (a2) may be used in combination with other halides such as halogenated silicon compound (e.g., $SiCl_4$) or $SOCl_2$.

Examples of the diester of aromatic dicarboxylic acid (hereinafter occasionally referred to as "component (a3)") as the component (a3) to be used for the preparation of the solid component (a) constituting the solid catalyst component (A1) of the present invention include diester of phthalic acid, and diester of terephthalic acid. Particularly preferred is a $C_{1-12}$ straight-chain or branched alkyl diester of phthalic acid. Specific examples of such a diester of phthalic acid include dimethyl phthalate, diethyl phthalate, di-n-propyl phthalate, di-iso-propyl phthalate, di-n-butyl phthalate, di-iso-butyl phthalate, ethyl methyl phthalate, methyl (iso-propyl) phthalate, ethyl (n-propyl) phthalate, ethyl (n-butyl) phthalate, di-n-pentyl phthalate, di-iso-pentyl phthalate, di-n-hexyl phthalate, di-n-hepthyl phthalate, di-n-octyl phthalate, bis(2-methylhexyl) phthalate, bis(2-ethylhexyl) phthalate, di-n-nonyl phthalate, di-iso-decyl phthalate, bis (2,2-dimethylheptyl) phthalate, n-butyl (iso-hexyl) phthalate, ethyl (iso-octyl) phthalate, n-butyl (iso-octyl) phthalate, n-pentyl (n-hexyl) phthalate, n-pentyl (iso-hexyl) phthalate, iso-pentyl (n-heptyl) phthalate, n-pentyl (iso-octyl) phthalate, n-pentyl (iso-nonyl) phthalate, iso-pentyl (n-decyl) phthalate, n-pentyl (n-undecyl) phthalate, iso-pentyl (iso-hexyl) phthalate, n-hexyl (iso-octyl) phthalate, n-hexyl (iso-nonyl) phthalate, n-hexyl (n-decyl) phthalate, n-heptyl (iso-octyl) phthalate, n-heptyl (iso-nonyl) phthalate, n-heptyl (neo-decyl) phthalate, and iso-octyl (iso-nonyl) phthalate. These diesters of phthalic acid may be used singly or in combination. Preferred among these diesters of phthalic acid are diethyl phthalate, di-n-butyl phthalate, di-iso-butyl phthalate, and bis(2-ethylhexyl) phthalate.

If two or more of these components (a3) are used in combination, their combination is not specifically limited. If diesters of phthalic acid are used, their combination is preferably such that the difference in the sum of the number of carbon atoms contained in two alkyl groups between one diester of phthalic acid and the other is at least 4. Specific examples of such a combination will be given below.

(1) Diethyl phthalate and di-n-butyl phthalate
(2) Diethyl phthalate and di-iso-butyl phthalate
(3) Diethyl phthalate and di-n-octyl phthalate
(4) Diethyl phthalate and bis(2-ethylhexyl) phthalate
(5) Di-n-butyl phthalate and di-n-octyl phthalate
(6) Di-n-butyl phthalate and bis(2-ethylhexyl) phthalate
(7) Diethyl phthalate, di-n-butyl phthalate and bis(2-ethylhexyl) phthalate
(8) Diethyl phthalate, di-iso-butyl phthalate and bis(2-ethylhexyl) phthalate If two or more components (a3) are used as mentioned above, it is preferred that they are brought into contact with the other components at different temperatures rather than at the same time.

The component (a3) may be used in combination with other electron donor compounds besides the foregoing essential components. As such an electron donor compound there may be used an organic compound containing oxygen or nitrogen. Examples of such an organic compound include alcohols, phenols, ethers, esters, ketones, acid halides, aldehydes, amines, amides, nitriles, isocyanates, and organic silicon compound such as alkylalkoxysilane and alkoxysilane.

Specific examples of these organic compounds include alcohols such as methanol, ethanol, propanol, butanol, pentanol, hexanol, octanol, 2-ethylhexanol and dodecanol, phenols such as phenol and cresol, ethers such as dimethyl ether, diethyl ether, dipropyl ether, dibutyl ether, diamyl ether and diphenyl ether, monocarboxylic acid esters such as methyl formate, ethyl acetate, vinyl acetate, propyl acetate, octyl acetate, cyclohexyl acetate, ethyl propionate, ethyl butyrate, methyl benzoate, ethyl benzoate, propyl benzoate, butyl benzoate, octyl benzoate, cyclohexyl benzoate, phenyl benzoate, methyl p-toluylate, ethyl p-toluylate, methyl anisate and ethyl anisate, diesters of dicarboxylic acid such as diethyl maleate, dibutyl maleate, dimethyl adipate, diethyl adipate, dipropyl adipate, dibutyl adipate, diisodecyl adipate and dioctyl adipate, ketones such as acetone, methyl ethyl ketone, methyl butyl ketone, acetophenone and benzophenone, acid halides such as phthalic acid dichloride and terephthalic acid dichloride, aldehydes such as acetaldehyde, propionaldehyde, octylaldehyde and benzaldehyde, amines such as methylamine, ethylamine, tributylamine, piperidine, aniline and pyridine, amides such as acetamide and acrylamide, nitriles such as acetonitrile, benzonitrile and trinitrile, and isocyanates such as phenyl isocyanate and n-butyl isocyanate.

Specific examples of the organic silicon compound such as alkylalkoxysilane and alkoxysilane include trimethoxysilane, trimethylethoxysilane, tri-n-propylmethoxysilane, tri-n-propylethoxysilane, tri-n-butylmethoxysilane, tri-iso-butylmethoxysilane, tri-t-butylmethoxysilane, tri-n-butylethoxysilane, tricyclohexylmethoxysilane, tricyclohexylethoxysilane, dimethyldimethoxysilane, dimethyldiethoxysilane, di-n-propyldimethoxysi lane, di-iso-propyldimethoxysilane, di-n-propyldiethoxysilane, di-iso-propyldiethoxysilane, di-n-butyldimethoxysilane, di-iso-butyldimethoxysilane, di-t-butyldimethoxysilane, di-n-butyldiethoxysilane, n-butyl methyldimethoxysilane, bis (2-ethylhexyl) dimethoxysilane, bis (2-ethylhexyl )diethoxysilane, dicyclohexyldimethoxysilane, dicyclohexyldiethoxysilane, dicyclopentyldimethoxysilane, dicyclopentyldiethoxysilane, cyclohexylmethyldimethoxysilane, cyclohexylmethyldiethoxysilane, cyclohexylethyldimethoxysilane, cyclohexyl(iso-propyl) dimethoxysilane, cyclohexylethyldiethoxysilane, cyclopentylmethyldimethoxysilane, cyclopentylmethyldiethoxysilane, cyclopentylethyldiethoxysilane, cyclopentyl(iso-propyl) dimethoxysilane, cyclohexyl(n-pentyl)dimethoxysilane, cyclohexyl(n-pentyl)diethoxysilane, cyclopentyl(iso-butyl) dimethoxysilane, cyclohexyl(n-propyl)dimethoxysilane, cyclohexyl(n-propyl)diethoxysilane, cyclohexyl(n-butyl) dimethoxysilane, cyclohexyl(n-butyl)diethoxysilane, cyclohexyl(iso-butyl)dimethoxysilane, diphenyldimethoxysilane, diphenyldiethoxysilane, phenylmethyldimethoxysilane, phenylmethyldiethoxysilane, phenylethyldimethoxysilane, phenylethyldiethoxysilane, cyclohexyldimethylmethoxysilane, cyclohexyldimethylethoxysilane, cyclohexyldiethylmethoxysilane, cyclohexyldiethylethoxysilane, 2-ethylihexyltrimethoxysilane, 2-ethylhexyltriethoxysi lane, methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, n-butyltrimethoxysilane, iso-butyltrimethoxysilane, t-butyltrimethoxysilane, n-butyltriethoxysilane, cyclohexyltrimethoxysilane, cyclohexyltriethoxysilane, cyclopentyltrimethoxysilane, cyclopentyltriethoxysilane, vinyltrimethoxysilane, vinyltriethoxysilane, 2-ethylhexyltrimethoxysilane, 2-ethylhexyltriethoxysilane, phenyltrimethoxysilane, phenyltriethoxysilane, tetramethoxysilane, tetraethoxysilane, cyclohexylcyclopentyldimethoxysilane, and cyclohexylcyclopentyldiethoxysilane.

The preparation of the solid component (b) constituting the solid catalyst component (A1) of the present invention will be described hereinafter.

As the dialkoxymagnesium or diaryloxymagnesium to be used as the component (b1) represented by the general formula [III] used for the preparation of the solid component (b) constituting the solid catalyst component (A1) of the present invention there may be used the same material as the component (a1) used for the preparation of the foregoing solid component (a).

As the titanium compound to be used as the component (b2) represented by the general formula [IV] used for the preparation of the solid component (b) constituting the solid catalyst component (A1) of the present invention there may be used the same material as the component (a2) used for the preparation of the foregoing solid component (a).

As the diester of aromatic dicarboxylic acid to be used as the component (b3) used for the preparation of the solid component (b) constituting the solid catalyst component (A1) of the present invention there may be used the same material as the component (a3) used for the preparation of the foregoing solid component (a). Further, in the preparation of the solid component (b), other electron donor compounds may be used with the component (b3) as an essential component. As such an electron donor compound there may be used an organic compound containing oxygen or nitrogen. Specific examples of such electron donor compounds include alcohols, phenols, ethers, esters, ketones, acid halides, aldehydes, amines, amides, nitriles, isocyanates, and organic silicon compound such as alkylalkoxysilane and alkoxysilane. Specific examples of these organic compounds include those listed with reference to the preparation of the solid component (a).

Specific examples of the component (a1) and the component (b1) may be the same. However, different compounds may be used without any problem. This applies to the component (a2) and the component (b2) and to the component (c1) and the component (c2).

As the polysiloxane (hereinafter occasionally referred to as "component (b4)") as the component (b4) to be used for the preparation of the solid component (b) constituting the solid catalyst component (A1) of the present invention there may be preferably used a polysiloxane represented by the following general formula [XIII]. Two or more such polysiloxanes may be used in combination.

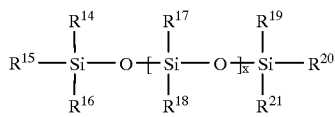

[XIII]

In the foregoing general formula [XIII], x represents an average polymerization degree, preferably of from 2 to 30,000. $R^{14}$ to $R^{21}$ each independently represents a methyl group, phenyl group, hydrogen, higher aliphatic acid residue, epoxy-containing group or polyoxyalkylene group. Examples of the polysiloxane to be used as the component (b4) include cyclic polysiloxanes.

The polysiloxane is also generically called silicone oil. It is a chain, partly-hydrogenated, cyclic or modified polysiloxane having a viscosity of from 2 to 10,000 cSt, preferably from 2 to 1,000 cSt, more preferably from 3 to 500 cSt, at 25° C. which stays liquid or viscous at ordinary temperature.

Examples of the chain polysiloxane include dimethylpolysiloxane, and methylphenylpolysiloxane. Examples of the partly-hydrogenated polysiloxane include methyl hydrogen polysiloxane having a percent hydrogenation of from 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane. Examples of the modified polysiloxane include higher aliphatic group-substituted dimethylsiloxane, epoxy group-substituted dimethylsiloxane, and polyoxyalkylene group-substituted dimethylsiloxane.

Specific examples of these polysiloxanes include TSF400, TSF401, TSF404, TSF4045, TSF410, TSF411, TSF433, TSF437, TSF4420, TSF451-5A, TSF451-lOA, TSF451-50A, TSF451-100, TSF483, and TSF484 [available from Toshiba Silicone Co., Ltd.], and KF96, KF96L, KF96H, KF69, KF92, KF961, KF965, KF56, KF99, KF94, KF995, KF105, KF351, HIVAC-F4, and HIVAC-F5 [available from Shin-Etsu Chemical Co., Ltd.].

Such a polysiloxane may be used in the form of solution in an organic solvent such as toluene, xylene, hexane and heptane.

[Preparation of solid component (a)]

The solid component (a) of the present invention may be prepared by allowing the components (a1), (a2) and (a3) to come into contact with one another. This preparation process can proceed in the absence of organic solvent but preferably in the presence of organic solvent taking into account the ease of operation. Examples of the organic solvent employable herein include saturated hydrocarbon such as hexane, heptane and cyclohexane, aromatic hydrocarbon such as benzene, toluene, xylene and ethylbenzene, and halogenated hydrocarbon such as orthodichlorobenzene, methylene chloride, carbon tetrachloride and dichloroethane. In particular, aromatic hydrocarbons having a boiling point of from about 90° C. to about 150° C. are preferred. Specific examples of such aromatic hydrocarbons include toluene, xylene, and ethylbenzene.

The component (a1) is suspended in the foregoing organic solvent (step 1). Subsequently, the suspension is brought into contact with the component (a2) (step 2). In either the step 1 or the step 2, the component (a3) is brought in contact with the suspension or reaction mixture. The component (a2) is preferably further allowed to contact with the solid reaction product of the foregoing steps twice or more times to enhance the catalytic activity. This reaction is preferably effected in the presence of the foregoing organic solvent, in particular aromatic hydrocarbon. Further, the second or subsequent reaction of the component (a2) preferably follows one or more washes of the solid reaction product with the foregoing organic solvent, in particular aromatic hydrocarbon.

The component (a3) may be added entirely at either the step 1 or the step 2 or batchwise at the steps 1 and 2. Alternatively, different diesters may be added at the steps 1 and 2, respectively. Further, a part of the component (a3) may be allowed to undergo reaction at either the step 1 or the step 2, and the balance of the component (a3) may be then added at the foregoing step of two or more reactions with the component (a2).

Specific examples of the procedure of addition of these components will be given below.

1. The components (a1), (a2) and (a3) are allowed to come in contact with one another at the same time.
2. The component (a3) is allowed to come in contact with a solid reaction product obtained by allowing the component (a1) and the component (a2) to come in contact with each other.
3. The component (a3) is allowed to come in contact with a solid reaction product obtained by allowing the component (a1) and the component (a2) to come in contact with each other. The component (a2) is then repeatedly allowed to come in contact with the resulting reaction product.
4. The component (a3) is allowed to come in contact with a solid reaction product obtained by allowing the component (a1) and the component (a2) to come in contact with each other. The component (a2) is then repeatedly allowed to come in contact with the resulting reaction product. The component (a2) is then further allowed to come in contact with the resulting reaction product.
5. The component (a2) is allowed to come in contact with a solid reaction product obtained by allowing the component (a1) and the component (a3) to come in contact with each other.
6. The component (a2) is allowed to come in contact with a solid reaction product obtained by allowing the component (a1) and the component (a3) to come in contact with each other. The component (a2) is then repeatedly allowed to come in contact with the resulting reaction product.

7. The component (a2) is allowed to come in contact with a solid reaction product obtained by allowing the component (a1) and the component (a3) to come in contact with each other. The component (a2) is then repeatedly allowed to come in contact with the resulting reaction product. The component (a2) is then further allowed to come in contact with the resulting reaction product.
8. The component (a3) is allowed to come in contact with a solid reaction product obtained by allowing the component (a1) and the component (a2) to come in contact with each other. The component (a2) and the component (a3) are then repeatedly allowed to come in contact with the resulting reaction product.
9. The component (a3) is allowed to come in contact with a solid reaction product obtained by allowing the component (a1) and the component (a2) to come in contact with each other. The component (a2) and the component (a3) are then repeatedly allowed to come in contact with the resulting reaction product. The component (a2) is further allowed to come in contact with the resulting reaction product.
10. The component (a2) is allowed to come in contact with a solid reaction product obtained by allowing the component (a1) and the component (a2) to come in contact with each other. The component (a2) and the component (a3) are then repeatedly allowed to come in contact with the resulting reaction product.
11. The component (a2) is allowed to come in contact with a solid reaction product obtained by allowing the component (a1) and the component (a3) to come in contact with each other. The component (a2) and the component (a3) are then repeatedly allowed to come in contact with the resulting reaction product. The component (a2) is further allowed to come in contact with the resulting reaction product.

The temperature at which the component (a1) is suspended in the organic solvent in the contact or reaction of the foregoing components is not specifically limited but is preferably not higher than 40° C. The suspension is effected with stirring for 1 minute to 5 hours.

The temperature at which the component (a2) is allowed to come in contact with the suspension of the component (a1) may be the same as used in the suspension of the component (a1) but is preferably not higher than 40° C., more preferably not higher than 20° C., most preferably from −10° C. to 15° C. Further, the process for contacting the component (a2) with the suspension of the component (a1) is not specifically limited. For example, the component (a2) may be added dropwise to the suspension of the component (a1). Alternatively, the suspension of the component (a1) may be added dropwise to the component (a2). Alternatively, the suspension of the component (a1) may be added dropwise to the component (a2) diluted with an organic solvent.

As mentioned above, the component (a2) which has been allowed to come in contact with the suspension of the component (a1) is then allowed to undergo reaction. The reaction temperature is from 0° C. to 130° C., preferably from 40° C. to 130° C., particularly preferably 70° C. to 120° C. The reaction time is not specifically limited but is normally from 10 minutes to 5 hours, preferably from 30 minutes to 3 hours.

The temperature at which the component (a3) is allowed to come in contact with the suspension or reaction mixture, too, is not specifically limited. In general, the component (a3) is added and allowed to come in contact with the suspension or reaction mixture within a temperature range of from −10° C. to 130° C. If two or more components (a3) are used in combination, or the same component (a3) is batchwise added as mentioned above, the addition and reaction of these components are effected within the same temperature range. These components may be added at the same or different temperatures.

The ratio of the components (a1), (a2) and (a3) varies with the preparation method and cannot be unequivocally defined. For example, the proportion of the component (a2) is from 0.5 to 100 mols, preferably from 1 to 10 mols per mol of the component (a1). The proportion of the component (a3) is normally at least 0.05 mols, preferably from 0.05 to 1 mol per mol of the component (a1).

In a preferred embodiment of the present invention, the solid reaction product obtained by contacting these components is thoroughly washed with an aliphatic hydrocarbon solvent such as n-heptane and n-hexane.

The process for the preparation of the solid component (a) will be described in detail hereinafter. Diethoxymagnesium is suspended as the component (a1) in an aromatic hydrocarbon solvent such as toluene at a temperature of from −10° C. to 30° C. To the suspension thus obtained is added titanium tetrachloride as the component (a2). In this procedure, the amount of titanium tetrachloride is preferably not more than ½ by volume of the solvent in which the component (a1) is suspended. Subsequently, the suspension is heated to a temperature of from 40° C. to 100° C. where dibutyl phthalate is then added thereto as the component (a3). The reaction system is heated to a temperature of from 100° C. to 120° C. where it is then kept to undergo reaction for 30 minutes to 3 hours to obtain a solid reaction product. Thereafter, the solid reaction product is washed with toluene within a temperature range of from 40° C. to 130° C. To the solid reaction product are then added toluene and titanium tetrachloride so that they are allowed to come in contact with the solid reaction product. The reaction system is heated to a temperature of from 100° C. to 120° C. where it is then kept to undergo reaction for 30 minutes to 3 hours. The resulting solid reaction product is washed with heptane to obtain a solid component (a).

[Preparation of solid component (b)]

The solid component (b) of the present invention may be prepared by allowing the component (b1), the component (b2), the component (b3) and the component (b4) to come in contact with one another. This preparation process can proceed in the absence of organic solvent but preferably in the presence of organic solvent taking into account the ease of operation. Examples of the organic solvent employable herein include saturated hydrocarbon such as hexane, heptane and cyclohexane, aromatic hydrocarbon such as benzene, toluene, xylene and ethylbenzene, and halogenated hydrocarbon such as orthodichlorobenzene, methylene chloride, carbon tetrachloride and dichloroethane. In particular, aromatic hydrocarbons having a boiling point of from about 90° C. to about 150° C. are preferred. Specific examples of such aromatic hydrocarbons include toluene, xylene, and ethylbenzene.

In the preparation of the solid component (b) of the present invention, the order of contact of the component (b1), the component (b2), the component (b3) and the component (b4) is not specifically limited. Specific examples of the procedure of contact of these components will be given below.

1. The components (b1), (b2), (b3) and (b4) are allowed to come in contact with one another at the same time.
2. The component (b4) is allowed to come in contact with a solid reaction product obtained by allowing the components (b1), (b2) and (b3) to come in contact with one another.

3. The component (b4) is allowed to come in contact with a solid reaction product obtained by allowing the components (b1), (b2) and (b3) to come in contact with one another. The component (b2) is repeatedly allowed to come in contact with the resulting reaction product.
4. The components (b2) and (b4) are allowed to come in contact with a solid reaction product obtained by allowing the components (b1) and (b3) to come in contact with each other.
5. The components (b2) and (b4) are allowed to come in contact with a solid reaction product obtained by allowing the components (b1) and (b3) to come in contact with each other. The component (b2) is repeatedly allowed to come in contact with the resulting reaction product.
6. The components (b3) and (b4) are allowed to come in contact with a solid reaction product obtained by allowing the components (b1) and (b2) to come in contact with each other. The component (b2) is repeatedly allowed to come in contact with the resulting reaction product.
7. The components (b3) and (b4) are allowed to come in contact with a solid reaction product obtained by allowing the components (b1) and (b2) to come in contact with each other. The components (b2) and (b3) are repeatedly allowed to come in contact with the resulting reaction product.
8. The component (b3) is allowed to come in contact with a solid reaction product obtained by allowing the components (b1) and (b2) to come in contact with each other. The component (b2) is repeatedly allowed to come in contact with the resulting reaction product. Thereafter, the component (b4) is allowed to come in contact with the resulting reaction product.
9. The components (b3) and (b4) are allowed to come in contact with a solid reaction product obtained by allowing the components (b1) and (b2) to come in contact with each other. The components (b2) and (b4) are repeatedly allowed to come in contact with the resulting reaction product.
10. The components (b3) and (b4) are allowed to come in contact with a solid reaction product obtained by allowing the components (b1) and (b2) to come in contact with each other. The component (b2) is repeatedly allowed to come in contact with the resulting reaction product. The component (b2) is further allowed to come in contact with the resulting solid reaction product.

The temperature at which the component (b1) is suspended in the organic solvent in the contact or reaction of the foregoing components is not specifically limited but is preferably not higher than 40° C. The suspension is effected with stirring for 1 minute to 5 hours.

Subsequently, the component (b2) is allowed to come in contact with the suspension of the component (b1). The temperature at which the suspension is effected may be the same or different from that used in the suspension of the component (b1). It is preferably not higher than 40° C., more preferably not higher than 20° C., particularly preferably from −10° C. to 15° C. Further, the process for contacting the component (b2) with the suspension of the component (b1) is not specifically limited. For example, the component (b2) may be added dropwise to the suspension of the component (b1). Alternatively, the suspension of the component (b1) may be added dropwise to the component (b2). Alternatively, the suspension of the component (b1) may be added dropwise to the component (b2) diluted with an organic solvent.

As mentioned above, the component (b2) which has been allowed to come in contact with the suspension of the component (b1) is then allowed to undergo reaction. The reaction temperature is from 0° C. to 130° C., preferably from 40° C. to 130° C., particularly preferably from 70° C. to 120° C. The reaction time is not specifically limited but is normally from 10 minutes to 5 hours, preferably from 30 minutes to 3 hours.

The temperature at which the component (b3) is allowed to come in contact with the other components, too, is not specifically limited. In general, the component (b3) is added and allowed to come in contact with the other components within a temperature range of from −10° C. to 130° C. If two or more components (b3) are used in combination, or the same component (b3) is batchwise added as mentioned above, the addition and reaction of these components are effected within the same temperature range. These components may be added at the same or different temperatures.

The order of contact of the component (b4) in the reaction of the components is arbitrary. Preferably, the component (b4) is allowed in the presence of the component (b2) to come in contact with a solid reaction product obtained by allowing the components (b1), (b2) and (b3) to come in contact with one another to enhance the bulk density of the polymer thus obtained and minimize the content of fine powder in the polymer thus obtained. In the foregoing reaction, the component (b2) is repeatedly allowed to come in contact with the resulting solid reaction product within a temperature range of from 40° C. to 130° C. for 1 minute or longer, preferably 5 minutes or longer, more preferably 10 minutes or longer. In this case, the component (b2) may be added as it is or may be diluted properly with the foregoing inert organic solvent before being added. The latter addition method is preferred. In a preferred embodiment of the present invention, the solid reaction product obtained by contact and reaction of the components at the previous stage is washed with the foregoing inert organic solvent before the repeated contact with the component (b2).

The proportion of the component (b2) to be used is from 0.1 to 200 ml, preferably from 0.5 to 100 ml per g of the component (b1). The proportion of the component (b3) to be used is from 0.01 to 1.0 g, preferably from 0.1 to 0.5 g per g of the component (b1). The proportion of the component (b4) to be used is from 0.01 to 10 g, preferably from 0.05 to 5.0 g per g of the component (b1). The amount of the inert organic solvent to be used is not specifically limited. It is preferably from 0.1 to 10 times by volume the component (b2) taking into account operational conditions. These components may be added batchwise during contact. Alternatively, one or more compounds may be properly selected.

The contact of these components may be effected in an atmosphere of inert gas free of water or the like with stirring in a vessel equipped with an agitator. The contact of these components may be effected at a relatively low temperature in the vicinity of room temperature if they are merely stirred and mixed or subjected to dispersion or suspension to undergo modification. If these components are reacted after contacted to obtain a reaction product, the contact is preferably effected within a temperature range of from 40° C. to 130° C. If the reaction temperature falls below 40° C., the reaction cannot proceed sufficiently, resulting in the production of a solid catalyst component having insufficient properties. On the contrary, if the reaction temperature exceeds 130° C., the solvent used remarkably evaporates, making it difficult to control the reaction. The reaction time is at least 1 minute, preferably at least 10 minutes, more preferably at least 30 minutes.

In a preferred embodiment of the present invention, the solid reaction product obtained by contacting these components is thoroughly washed with an aliphatic hydrocarbon solvent such as n-heptane and n-hexane.

The process for the preparation of the solid component (b) will be described in detail hereinafter.

(1) Diethoxymagnesium is suspended as the component (b1) in an aromatic hydrocarbon solvent such as toluene within a temperature range of from −10° C. to 30° C. To the suspension thus obtained is added titanium tetrachloride as the component (b2). In this procedure, the amount of titanium tetrachloride is preferably not more than ½ by volume of the solvent in which the component (b1) is suspended. Subsequently, to the suspension is added dibutyl phthalate as the component (b3). The temperature at which this procedure is effected is the same as used in the suspension of the component (b1) in toluene. Subsequently, the suspension is heated to a temperature of from 50° C. to 110° C. where decamethylcyclopentasiloxane is then added thereto as the component (b4). The reaction system is heated to a temperature of from 100° C. to 120° C. where it is then kept to undergo reaction for 30 minutes to 3 hours to obtain a solid reaction product. The solid reaction product is then washed with toluene within a temperature range of from 40° C. to 130° C. for 1 minute. To the resulting solid reaction product are then added toluene and titanium tetrachloride so that they are allowed to come in contact with the solid reaction product. The reaction system is heated to a temperature of from 100° C. to 120° C. where it is then kept to undergo reaction for 30 minutes to 3 hours. The solid reaction product is washed with heptane to obtain a solid component (b).

(2) Diethoxymagnesium is suspended as the component (b1) in an aromatic hydrocarbon solvent such as toluene within a temperature range of from −10° C. to 30° C. To the suspension thus obtained is added titanium tetrachloride as the component (b2). In this procedure, the amount of titanium tetrachloride is preferably not more than ½ by volume of the solvent in which the component (b1) is suspended. Subsequently, to the suspension is added di-iso-octyl phthalate as the component (b3) within a temperature range of from 30° C. to 60° C. Further, to the suspension is added diethyl phthalate within a temperature range of from 60° C. to 80° C. Subsequently, the suspension is heated to a temperature of from 80° C. to 110° C. where decamethylcyclopentasiloxane is then added thereto as the component (b4). The reaction system is further heated to a temperature of from 100° C. to 120° C. where it is then kept to undergo reaction for 30 minutes to 3 hours to obtain a solid reaction product. The solid reaction product is washed with titanium tetrachloride diluted with toluene and then with toluene within a temperature range of from 40° C. to 130° C. for 1 minute or longer. To the resulting solid reaction product are then added toluene and titanium tetrachloride so that they are allowed to come in contact with the solid reaction product. The reaction system is heated to a temperature of from 100° C. to 120° C. where it is then kept to undergo reaction for 30 minutes to 3 hours. The solid reaction product is washed with heptane to obtain a solid component (b).

[Preparation of solid catalyst component (A1)]

The solid catalyst component (A1) of the present invention is prepared from the solid component (a) and the solid component (b). In some detail, the solid catalyst component (A1) is prepared by a process which comprises mixing these components, and then treating the mixture. More particularly, the mixing of these components is effected in Nauta mixer, V-style mixer, vibration mill, ball mill, or a tank, reactor or the like equipped with an agitator.

The mixing is effected in the presence or absence of organic solvent. Examples of the organic solvent employable herein include saturated hydrocarbon such as hexane, heptane and cyclohexane, aromatic hydrocarbon such as benzene, toluene, xylene and ethylbenzene, and halogenated hydrocarbon such as orthodichlorobenzene, methylene chloride, carbon tetrachloride and dichloroethane.

The temperature at which the solid component (a) and the solid component (b) are mixed in the presence or absence of organic solvent is not specifically limited but is normally from 0° C. to 150° C., preferably from 0° C. to 120° C. The time during which these components are mixed is from 1 minute to 10 hours, preferably from 5 minutes to 5 hours. In a preferred embodiment of the present invention, the mixing of these components is accompanied by treatment at room temperature or higher temperature, i.e., so-called heat treatment. The use of the solid catalyst component (A1) obtained by the heat treatment in the polymerization of olefins makes it possible to control excessive heat generation in the initial stage of polymerization, resulting in the high yield production of a polymer having a less content of fine powder and a higher bulk density. The heat treatment is normally effected within a temperature range of from 50° C. to 150° C., preferably from 80° C. to 100° C., for 1 minute to 5 hours, preferably 5 minutes to 3 hours.

The mixing of the solid component (a) and the solid component (b) is effected in such a manner that the weight ratio of solid component (a) to solid component (b) ((a)/(b)) is from 1:99 to 99:1. The weight ratio (a):(b) is preferably from 5:95 to 95:5, more preferably from 10:90 to 90:10.

By properly varying the mixing ratio of the solid component (a) and the solid component (b) within the above defined range, the stereoregularity or crystallinity of the polymer obtained by the polymerization of olefins in the presence of the solid catalyst component (A1) thus prepared can be controlled. In some detail, in order to enhance the stereoregularity or crystallinity of the polymer, the mixing ratio of the solid component (a) is increased. In order to lower the stereoregularity or crystallinity of the polymer, the mixing ratio of the solid component (b) is increased. In other words, in the preparation of an olefin polymer, the mixing ratio of these components can be predetermined to attain the stereoregularity or crystallinity required for the desired grade of the polymer to allow the stable production of a polymer having desired physical properties.

In a preferred embodiment of the process for the preparation of the solid catalyst component (A1), the foregoing mixing of the solid component (a) and the solid component (b) is followed by another contact of at least one of the components (a2), (a3), (b2), (b3) and (b4) used for the preparation of the solid component (a) or (b) with the mixture to obtain a polymer having the predetermined stereoregularity or crystallinity in a high yield.

The order of contact of the components (a2), (a3), (b2), (b3) and (b4) with the mixture of the solid component (a) and the solid component (b) is not specifically limited but is arbitrary. Specific examples of the procedure of contact of these components will be given below.

1. The component (a2) (or (b2)) is allowed to come in contact with the mixture of the solid component (a) and the solid component (b).
2. The components (a2) and (a3) (or (b2) and (b3)) are allowed to come in contact with the mixture of the solid component (a) and the solid component (b).

3. The components (a2) and (a3) (or (b2) and (b3)) and the component (b4) are allowed to come in contact with the mixture of the solid component (a) and the solid component (b).

The conditions (e.g., temperature, time, weight ratio to the mixture) under which each component is allowed to come in contact with the mixture of the solid component (a) and the solid component (b) are arbitrary and not specifically limited. The same conditions as used in the preparation of the solid component (a) or (b) may be employed.

A specific example of the process which comprises allowing the components to come in contact with the mixture of the solid component (a) and the solid component (b) will be given below.

The solid component (a) and the solid component (b) are suspended in an aromatic hydrocarbon such as toluene within a temperature range of from −10° C. to 30° C. in such an amount that the weight ratio (a):(b) is from 1:99 to 99:1. To the suspension is added titanium tetrachloride as the component (a2) (or (b2)). The amount of titanium tetrachloride to be used in this process is preferably not more than ½ by volume of the solvent in which the solid component (a) and the solid component (b) are suspended. The suspension is heated to a temperature of from 90° C. to 120° C. where it is then kept for 30 minutes to 3 hours to obtain a solid reaction product. Finally, the solid reaction product is washed with heptane to obtain a solid catalyst component (A1).

[Solid catalyst component (A2)]

The component (c1) to be used for the preparation of the solid component (c) constituting the solid catalyst component (A2) of the present invention (hereinafter occasionally referred to as "component (A2)") is a dialkoxymagnesium or diaryloxymagnesium (hereinafter occasionally referred to as "component (c1)") represented by the general formula [V]: $Mg(OR^5)_2$ (in which $R^5$ represents a $C_{1-4}$ alkyl or aryl group). Specific examples of the dialkoxymagnesium or diaryloxymagnesium include the same compounds as the dialkoxymagnesium or diaryloxymagnesium represented by the general formula [I] used in the preparation of the solid component (a) constituting the foregoing catalyst component (A1).

The component (c2) to be used for the preparation of the solid component (c) constituting the solid catalyst component (A2) of the present invention is a titanium compound (hereinafter occasionally referred to as "component (c2)") represented by the general formula [VI]: $Ti(OR^6)_m X_{4-m}$ (in which $R^6$ represents a $C_{1-4}$ alkyl group, X represents a halogen atom, and m represents 0 or an integer of from 1 to 3). Specific examples of the titanium compound include the same compounds as the titanium compound represented by the general formula [II] used in the preparation of the solid component (a) constituting the foregoing solid catalyst component (A1).

Examples of the diester of aromatic dicarboxylic acid (hereinafter occasionally referred to as "component (c3)") to be used as the component (c3) in the preparation of the solid component (c) constituting the solid catalyst component (A2) of the present invention include the same compounds as the diester of aromatic dicarboxylic acid used in the preparation of the solid component (a) constituting the foregoing solid catalyst component (A1).

The component (d1) to be used for the preparation of the solid component (d) constituting the solid catalyst component (A2) of the present invention is a dialkoxymagnesium or diaryloxymagnesium (hereinafter occasionally referred to as "component (d1)") represented by the general formula [VII]: $Mg(OR^7)_2$ (in which $R^7$ represents a $C_{1-4}$ alkyl or aryl group). Specific examples of the dialkoxymagnesium or diaryloxymagnesium include the same compounds as the dialkoxymagnesium or diaryloxymagnesium represented by the general formula [III] used in the preparation of the solid component (b) constituting the foregoing solid catalyst component (A1).

The component (d2) to be used for the preparation of the solid component (d) constituting the solid catalyst component (A2) of the present invention is a titanium compound (hereinafter occasionally referred to as "component (d2)") represented by the general formula [VIII]: $Ti(OR^8)_m X_{4-m}$ (in which $R^8$ represents a $C_{1-4}$ alkyl group, X represents a halogen atom, and m represents 0 or an integer of from 1 to 3). Specific examples of the titanium compound include the same compounds as the titanium compound represented by the general formula [IV] used in the preparation of the solid component (b) constituting the foregoing solid catalyst component (A1).

Examples of the diester of aromatic dicarboxylic acid (hereinafter occasionally referred to as "component (d3)") to be used as the component (d3) in the preparation of the solid component (d) constituting the solid catalyst component (A2) of the present invention include the same compounds as the diester of aromatic dicarboxylic acid used in the preparation of the solid component (a) constituting the foregoing solid catalyst component (A1).

Examples of the polysiloxane (hereinafter occasionally referred to as "component (d4)") to be used as the component (d4) in the preparation of the solid component (d) constituting the solid catalyst component (A2) of the present invention include the same compounds as the polysiloxane used in the preparation of the solid component (b) constituting the foregoing solid catalyst component (A1).

The aluminum compound (hereinafter occasionally referred to as "component (d5)") to be used as the component (d5) in the preparation of the solid component (d) constituting the solid catalyst component (A2) of the present invention comprises at least one compound selected from the group consisting of aluminum compounds represented by the following general formulae [IX] and [X]:

$$Al(OR^9)_n X_{3-n} \qquad [IX]$$

wherein $R^9$ represents a $C_{1-4}$ alkyl or aryl group; X represents a halogen atom; and n represents a real number of from at least 0 to not more than 3.

$$R^{10}_p AlQ_{3-p} \qquad [X]$$

wherein $R^{10}$ represents a $C_{1-4}$ alkyl group; Q represents a hydrogen atom or halogen atom; and p represents a real number of more than 0 to not more than 3.

Examples of the aluminum compound represented by the general formula [IX] include aluminum trihalide, alkoxyaluminum dihalide, dialkoxyaluminum halide, and trialkoxyaluminum. Specific examples of these aluminum compounds include aluminum trichloride, aluminum tribromide, aluminum triiodide, diethoxyaluminum chloride, di-iso-propoxyaluminum chloride, dibutoxyaluminum chloride, ethoxyaluminum dichloride, iso-propoxyaluminum dichloride, butoxyaluminum dichloride, trimethoxyaluminum, triethoxyaluminum, tripropoxyaluminum, tri-iso-propoxyaluminum, tributoxyaluminum, tri-iso-butoxyaluminum, and phenoxyaluminum dichloride. Preferred among these aluminum compounds are aluminum trichloride, di-iso-propoxyaluminum chloride, iso-propoxyaluminum dichloride, triethoxyaluminum, and tri-iso-propoxyaluminum.

Examples of the aluminum compound represented by the general formula [X] include trialkylaluminum, dialkylaluminum hydride, dialkylaluminum halide, and alkylaluminum dihalide. Specific examples of these aluminum compounds include triethylaluminum, tri-iso-butylaluminum, diethylaluminum hydride, di-iso-butylaluminum hydride, diethylaluminum hydride, di-iso-butylaluminum chloride, ethylaluminum dichloride, propylaluminum dichloride, ethylaluminum sesquichloride, and butylaluminum sesquichloride. Preferred among these aluminum compounds are triethylaluminum, diethylaluminum chloride, ethylaluminum dichloride, and ethylaluminum sesquichloride.

As the foregoing components (d5) there may be used one or more selected from the group consisting of compounds represented by the foregoing general formulae [IX] and [X]. The component (d5) may be allowed to come in contact with the other components as it is or may be dissolved in or diluted with an organic solvent such as aromatic hydrocarbon (e.g., toluene, xylene) and aliphatic hydrocarbon (e.g., hexane, heptane) before use.

[Preparation of solid component (c)]

The solid component (c) constituting the solid catalyst component (A2) of the present invention may be prepared by allowing the component (c1), the component (c2), and the component (c3) to come in contact with one another. This preparation process is the same as used in the preparation of the solid component (a) constituting the solid catalyst component (A1).

In other words, the each component may be treated in the absence of organic solvent but preferably in the presence of organic solvent taking into account the ease of operation. Examples of the organic solvent employable herein include saturated hydrocarbon such as hexane, heptane and cyclohexane, aromatic hydrocarbon such as benzene, toluene, xylene and ethylbenzene, and halogenated hydrocarbon such as orthodichlorobenzene, methylene chloride, carbon tetrachloride and dichloroethane. In particular, aromatic hydrocarbons having a boiling point of from about 90° C. to about 150° C. are preferred. Specific examples of such aromatic hydrocarbons include toluene, xylene, and ethylbenzene.

The component (c1) is suspended in the foregoing organic solvent (step 1). Subsequently, the suspension is brought into contact with the component (c2) (step 2). In either the step 1 or the step 2, the component (c3) is brought in contact with the suspension or reaction mixture. The component (c2) is preferably further allowed to undergo reaction with the solid reaction product of the foregoing steps twice or more times to enhance the catalytic activity. This reaction is preferably effected in the presence of the foregoing organic solvent, in particular aromatic hydrocarbon. Further, the second or subsequent reaction of the component (c2) preferably follows one or more washes of the solid reaction product with the foregoing organic solvent, in particular aromatic hydrocarbon.

The component (c3) may be added entirely at either the step 1 or the step 2 or batchwise at the steps 1 and 2. Alternatively, different diesters may be added at the steps 1 and 2, respectively. Further, a part of the component (c3) may be allowed to undergo reaction at either the step 1 or the step 2, and the balance of the component (c3) may be then added at the foregoing step of two or more reactions with the component (c2).

Specific examples of the procedure of addition of these components will be given below.

1. The components (c1), (c2) and (c3) are allowed to come in contact with one another at the same time.
2. The component (c3) is allowed to come in contact with a solid reaction product obtained by allowing the component (c1) and the component (c2) to come in contact with each other.
3. The component (c3) is allowed to come in contact with a solid reaction product obtained by allowing the component (c1) and the component (c2) to come in contact with each other. The component (c2) is then repeatedly allowed to come in contact with the resulting reaction product.
4. The component (c3) is allowed to come in contact with a solid reaction product obtained by allowing the component (c1) and the component (c2) to come in contact with each other. The component (c2) is then repeatedly allowed to come in contact with the resulting reaction product. The component (c2) is then further allowed to come in contact with the resulting solid reaction product.
5. The component (c2) is allowed to come in contact with a solid reaction product obtained by allowing the component (c1) and the component (c3) to come in contact with each other.
6. The component (c2) is allowed to come in contact with a solid reaction product obtained by allowing the component (c1) and the component (c3) to come in contact with each other. The component (c2) is then repeatedly allowed to come in contact with the resulting solid reaction product.
7. The component (c2) is allowed to come in contact with a solid reaction product obtained by allowing the component (c1) and the component (c3) to come in contact with each other. The component (c2) is then repeatedly allowed to come in contact with the resulting reaction product. The component (c2) is then further allowed to come in contact with the resulting reaction product.
8. The component (c3) is allowed to come in contact with a solid reaction product obtained by allowing the component (c1) and the component (c2) to come in contact with each other. The component (c2) and the component (c3) are then repeatedly allowed to come in contact with the resulting reaction product.
9. The component (c3) is allowed to come in contact with a solid reaction product obtained by allowing the component (c1) and the component (c2) to come in contact with each other. The component (c2) and the component (c3) are then repeatedly allowed to come in contact with the resulting reaction product. The component (c2) is further allowed to come in contact with the resulting reaction product.
10. The component (c2) is allowed to come in contact with a solid reaction product obtained by allowing the component (c1) and the component (c2) to come in contact with each other. The component (c2) and the component (c3) are then repeatedly allowed to come in contact with the resulting reaction product.
11. The component (c2) is allowed to come in contact with a solid reaction product obtained by allowing the component (c1) and the component (c3) to come in contact with each other. The component (c2) and the component (c3) are then repeatedly allowed to come in contact with the resulting reaction product. The component (c2) is further allowed to come in contact with the resulting reaction product.

The temperature at which the component (c1) is suspended in the organic solvent in the contact or reaction of the foregoing components is not specifically limited but is preferably not higher than 40° C. The suspension is effected with stirring for 1 minute to 5 hours.

The temperature at which the component (c2) is allowed to come in contact with the suspension of the component (c1) may be the same as used in the suspension of the component (c1) but is preferably not higher than 40° C., more preferably not higher than 20° C., most preferably from −10° C. to 15° C. Further, the process for contacting the component (c2) with the suspension of the component (c1) is not specifically limited. For example, the component (c2) may be added dropwise to the suspension of the component (c1). Alternatively, the suspension of the component (c1) may be added dropwise to the component (c2). Alternatively, the suspension of the component (c1) may be added dropwise to the component (c2) diluted with an organic solvent.

As mentioned above, the component (c2) which has been allowed to come in contact with the suspension of the component (c1) is then allowed to undergo reaction. The reaction temperature is from 0° C. to 130° C., preferably from 40° C. to 130° C., particularly preferably 70° C. to 120° C. The reaction time is not specifically limited but is normally from 10 minutes to 5 hours, preferably from 30 minutes to 3 hours.

The temperature at which the component (c3) is allowed to come in contact with the other components, too, is not specifically limited. In general, the component (c3) is added and allowed to come in contact with the other components within a temperature range of −10° C. to 130° C. If two or more components (c3) are used in combination, or the same component (c3) is batchwise added as mentioned above, the addition and reaction of these components are effected within the same temperature range. These components may be added at the same or different temperatures.

The ratio of the components (c1), (c2) and (c3) varies with the preparation method and cannot be unequivocally defined. For example, the proportion of the component (c2) is from 0.5 to 100 mols, preferably from 1 to 10 mols per mol of the component (c1). The proportion of the component (c3) is normally at least 0.05 mols, preferably from 0.05 to 1 mol per mol of the component (c1).

In a preferred embodiment of the present invention, the solid reaction product obtained by contacting these components is thoroughly washed with an aliphatic hydrocarbon solvent such as n-heptane and n-hexane.

The process for the preparation of the solid component (c) will be described in detail hereinafter. Diethoxymagnesium is suspended as the component (c1) in an aromatic hydrocarbon solvent such as toluene at a temperature of from −10° C. to 30° C. To the suspension thus obtained is added titanium tetrachloride as the component (c2). In this procedure, the amount of titanium tetrachloride is preferably not more than ½ by volume of the solvent in which the component (c1) is suspended. Subsequently, the suspension is heated to a temperature of from 40° C. to 100° C. where dibutyl phthalate is then added thereto as the component (c3). The reaction system is heated to a temperature of from 100° C. to 120° C. where it is then kept to undergo reaction for 30 minutes to 3 hours to obtain a solid reaction product. Thereafter, the solid reaction product is washed with toluene within a temperature range of from 40° C. to 130° C. for 1 minute or longer. To the solid reaction product are then added toluene and titanium tetrachloride so that they are allowed to come in contact with the solid reaction product. The reaction system is heated to a temperature of from 10° C. to 120° C. where it is then kept to undergo reaction for 30 minutes to 3 hours. The resulting solid reaction product is washed with heptane to obtain a solid component (c).

[Preparation of solid component (d)]

The solid component (d) constituting the solid catalyst component (A2) of the present invention may be prepared by allowing the component (d1), the component (d2), the component (d3), the component (d4) and the component (d5) to come in contact with one another. This preparation process can proceed in the absence of organic solvent but preferably in the presence of organic solvent taking into account the ease of operation. Examples of the organic solvent employable herein include saturated hydrocarbon such as hexane, heptane and cyclohexane, aromatic hydrocarbon such as benzene, toluene, xylene and ethylbenzene, and halogenated hydrocarbon such as orthodichlorobenzene, methylene chloride, carbon tetrachloride and dichloroethane. In particular, aromatic hydrocarbons having a boiling point of from about 90° C. to about 150° C. are preferred. Specific examples of such aromatic hydrocarbons include toluene, xylene, and ethylbenzene.

In the preparation of the solid component (d) of the present invention, the order of contact of the component (d1), the component (d2), the component (d3), the component (d4) and the component (d5) is not specifically limited. Specific examples of the procedure of contact of these components will be given below.

1. The components (d1), (d2), (d3), (d4) and (d5) are allowed to come in contact with one another at the same time.

2. The component (d2) is repeatedly allowed to come in contact with a solid reaction product obtained by allowing the components (d1), (d2), (d3), (d4) and (d5) to come in contact with one another.

3. The components (d3) and (d5) are allowed to come in contact with a solid reaction product obtained by allowing the components (d1), (d2) and (d5) to come in contact with one another.

4. The components (d3) and (d4) are allowed to come in contact with a solid reaction product obtained by allowing the components (d1), (d2) and (d5) to come in contact with one another. The component (d2) is then repeatedly allowed to come in contact with the resulting reaction product.

5. The component (d5) is allowed to come in contact with a solid reaction product obtained by allowing the components (d1), (d2), (d3) and (d4) to come in contact with one another.

6. The component (d5) is allowed to come in contact with a solid reaction product obtained by allowing the components (d1), (d2), (d3) and (d4) to come in contact with one another. The component (d2) is then repeatedly allowed to come in contact with the resulting reaction product.

7. The component (d5) is allowed to come in contact with a solid reaction product obtained by allowing the components (d1), (d2), (d3) and (d4) to come in contact with one another. The components (d5) and (d2) are then repeatedly allowed to come in contact with the resulting reaction product.

8. The components (d2) and (d5) are repeatedly allowed to come in contact with a solid reaction product obtained by allowing the components (d1), (d2), (d3), (d4) and (d5) to come in contact with one another.

The temperature at which the component (d1) is suspended in the organic solvent in the contact or reaction of the foregoing components is not specifically limited but is preferably not higher than 40° C. The suspension is effected with stirring for 1 minute to 5 hours.

Subsequently, the component (d2) is allowed to come in contact with the suspension of the component (d1). The temperature at which the suspension is effected may be the same or different from that used in the suspension of the component (d1). It is preferably not higher than 40° C., more preferably not higher than 20° C., particularly preferably from −10° C. to 15° C. Further, the process for contacting the component (d2) with the suspension of the component (d1) is not specifically limited. For example, the component (d2) may be added dropwise to the suspension of the component (d1). Alternatively, the suspension of the component (d1) may be added dropwise to the component (d2). Alternatively, the suspension of the component (d1) may be added dropwise to the component (d2) diluted with an organic solvent.

As mentioned above, the component (d2) which has been allowed to come in contact with the suspension of the component (d1) is then allowed to undergo reaction. The reaction temperature is from 0° C. to 130° C., preferably from 40° C. to 130° C., particularly preferably from 70° C. to 120° C. The reaction time is not specifically limited but is normally from 10 minutes to 5 hours, preferably from 30 minutes to 3 hours.

The temperature at which the component (d3) is allowed to come in contact with the other components, too, is not specifically limited. In general, the component (d3) is added and allowed to come in contact with the other components within a temperature range of from −10° C. to 130° C. If two or more components (d3) are used in combination, or the same component (d3) is batchwise added as mentioned above, the addition and reaction of these components are effected within the same temperature range. These components may be added at the same or different temperatures.

The order of contact of the components (d4) and (d5) in the reaction of the components is arbitrary. Preferably, the components (d4) and (d5) are allowed to come in contact with a solid reaction product obtained by allowing the components (d1), (d2) and (d3) to come in contact with one another to minimize the content of fine powder in the polymer thus obtained while maintaining the predetermined density of the polymer. In the foregoing reaction, the component (d2) and/or the component (d5) is repeatedly allowed to come in contact with the resulting solid reaction product within a temperature range of from 40° C. to 130° C. for 1 minute or longer, preferably 10 minutes or longer, more preferably 30 minutes or longer. In this case, the components (d2) and (d5) may be added as they are or may be diluted properly with the foregoing inert organic solvent before being added. The latter addition method is preferred. In a preferred embodiment of the present invention, the solid reaction product obtained by contact and reaction of the components at the previous stage is washed with the foregoing inert organic solvent before the repeated contact with the component (d2) and/or the component (d5).

The proportion of the component (d2) to be used is from 0.1 to 200 ml, preferably from 0.5 to 100 ml per g of the component (d1). The proportion of the component (d3) to be used is from 0.01 to 1.0 g, preferably from 0.1 to 0.5 g per g of the component (d1). The proportion of the component (d4) to be used is from 0.01 to 10 g, preferably from 0.05 to 5.0 g per g of the component (d1). The proportion of the component (d5) to be used is from 0.01 to 10 g, preferably from 0.05 to 2.0 g per g of the component (d1). The amount of the inert organic solvent to be used is not specifically limited. It is preferably from 0.1 to 10 times by volume the component (d2) taking into account operational conditions. These components may be added batchwise during contact. Alternatively, one or more compounds may be properly selected.

The contact of these components may be effected in an atmosphere of inert gas free of water or the like with stirring in a vessel equipped with an agitator. The contact of these components may be effected at a relatively low temperature in the vicinity of room temperature if they are merely stirred and mixed or subjected to dispersion or suspension to undergo modification. If these components are reacted after contacted to obtain a reaction product, the contact is preferably effected within a temperature range of from 40° C. to 130° C. If the reaction temperature falls below 40° C., the reaction cannot proceed sufficiently, resulting in the production of a solid catalyst component having insufficient properties. On the contrary, if the reaction temperature exceeds 130° C., the solvent used remarkably evaporates, making it difficult to control the reaction. The reaction time is at least 1 minute, preferably at least 10 minutes, more preferably at least 30 minutes.

In a preferred embodiment of the present invention, the solid reaction product obtained by contacting these components is thoroughly washed with an aliphatic hydrocarbon solvent such as n-heptane and n-hexane.

The process for the preparation of the solid component (d) will be described in detail hereinafter.

(1) Diethoxymagnesium as the component (d1) and aluminum trichloride as the component (d5) are suspended in an aromatic hydrocarbon solvent such as toluene within a temperature range of from −10° C. to 30° C. To the suspension thus obtained is added titanium tetrachloride as the component (d2). In this procedure, the amount of titanium tetrachloride is preferably not more than ½ by volume of the solvent in which the component (d1) is suspended. The suspension is heated to a temperature of from 40° C. to 100° C. where dibutyl phthalate was then added thereto as the component (d3). The suspension is further heated to a temperature of from 60° C. to 80° C. where diethyl phthalate was then added thereto and dimethyl polysiloxane was then added thereto as the component (d4). The reaction system is heated to a temperature of from 100° C. to 120° C. where it is then kept to undergo reaction for 30 minutes to 3 hours to obtain a solid reaction product. The solid reaction product is washed with titanium tetrachloride diluted with toluene and then washed with toluene within a temperature range of from 40° C. to 130° C. for 1 minute or longer. To the resulting solid reaction product are then added toluene and titanium tetrachloride so that they are allowed to come in contact with the solid reaction product. The reaction system is heated to a temperature of from 100° C. to 120° C. where it is then kept to undergo reaction for 30 minutes to 3 hours. In this process, aluminum trichloride may be again added as the component (d5). Finally, the solid reaction product is washed with heptane to obtain a solid component (d).

(2) Diethoxymagnesium is suspended as the component (d1) in an aromatic hydrocarbon solvent such as toluene within a temperature range of from −10° C. to 30° C. To the suspension thus obtained is added titanium tetrachloride as the component (d2). In this procedure, the amount of titanium tetrachloride is preferably not more than ½ by volume of the solvent in which the component (d1) is suspended. Subsequently, to the suspension is added di-iso-octyl phthalate as the component (d3) within a temperature range of from 30° C. to 60° C. Further, to the suspension is added diethyl phthalate within a temperature range of from 60° C. to 80° C. Subsequently, the suspension is heated to a temperature of from 80° C. to 100° C. where dimethylpolysiloxane is then added thereto as the component (d4). The reaction system is further heated to a temperature of from 100° C. to 120° C. where it is then kept to undergo reaction for 30 minutes to 3 hours to obtain a solid reaction product. The solid reaction product is washed with titanium tetrachloride diluted with toluene and then with toluene within a temperature range of from 40° C. to 130° C. for 1 minute or longer. To the resulting solid reaction product is then added aluminum trichloride as the component (d5) so that they are allowed to come in contact with each other. In this process, the component (d5) is preferably added in the form of solution in an organic solvent such as toluene to undergo uniform reaction. To the reaction mixture is then added titanium tetrachloride. The reaction system is heated to a temperature of from 100° C. to 120° C. where it is then kept to undergo reaction for 30 minutes to 3 hours. The resulting solid reaction product is then washed with heptane to obtain a solid component (d).

[Preparation of solid catalyst component (A2)]

The solid catalyst component (A2) of the present invention can be prepared in the same manner as in the preparation of the foregoing solid catalyst component (A1).

In some detail, the solid component (c) and the solid component (d) are mixed in Nauta mixer, V-style mixer, vibration mill, ball mill, or a tank, reactor or the like equipped with an agitator.

The mixing is effected in the presence or absence of organic solvent. Examples of the organic solvent employable herein include saturated hydrocarbon such as hexane, heptane and cyclohexane, aromatic hydrocarbon such as benzene, toluene, xylene and ethylbenzene, and halogenated hydrocarbon such as orthodichlorobenzene, methylene chloride, carbon tetrachloride and dichloroethane.

The temperature at which the solid component (c) and the solid component (d) are mixed in the presence or absence of organic solvent is not specifically limited but is normally from 0° C. to 150° C., preferably from 0° C. to 120° C. The time during which these components are mixed is from 1 minute to 10 hours, preferably from 5 minutes to 5 hours. In a preferred embodiment of the present invention, the mixing of these components is accompanied by treatment at room temperature or higher temperature, i.e., so-called heat treatment. The use of the solid catalyst component (A2) obtained by the heat treatment in the polymerization of olefins makes it possible to control excessive heat generation in the initial stage of polymerization, resulting in the high yield production of a polymer having a less content of fine powder and a higher bulk density. The heat treatment is normally effected within a temperature range of from 50° C. to 150° C., preferably from 80° C. to 100° C., for 1 minute to 5 hours, preferably 5 minutes to 3 hours.

The mixing of the solid component (c) and the solid component (d) is effected in such a manner that the weight ratio of solid component (c) to solid component (d) ((c):(d)) is from 1:99 to 99:1. The weight ratio (c):(d) is preferably from 5:95 to 95:5, more preferably from 10:90 to 90:10.

By properly varying the mixing ratio of the solid component (c) and the solid component (d) within the above defined range, the stereoregularity or crystallinity of the polymer obtained by the polymerization of olefins in the presence of the solid catalyst component (A2) thus prepared can be controlled. In some detail, in order to enhance the stereoregularity or crystallinity of the polymer, the mixing ratio of the solid component (c) is increased. In order to lower the stereoregularity or crystallinity of the polymer, the mixing ratio of the solid component (d) is increased. In other words, in the preparation of an olefin polymer, the mixing ratio of these components can be predetermined to attain the stereoregularity or crystallinity required for the desired grade of the polymer to allow the stable production of a polymer having desired physical properties.

In a preferred embodiment of the process for the preparation of the solid catalyst component (A2), the foregoing mixing of the solid component (c) and the solid component (d) is followed by another contact of at least one of the components (c2), (c3), (d2), (d3), (d4) and (d5) used for the preparation of the solid component (c) or (d) with the mixture to obtain a polymer having the predetermined stereoregularity or crystallinity in a high yield.

The order of contact of the components (c2), (c3), (d2), (d3), (d4) and (d5) with the mixture of the solid component (c) and the solid component (d) is not specifically limited but is arbitrary. Specific examples of the procedure of contact of these components will be given below.

1. The component (c2) or (d2) is allowed to come in contact with the mixture of the solid component (c) and the solid component (d).
2. The components (c2) and (c3) (or (d2) and (d3)) are allowed to come in contact with the mixture of the solid component (c) and the solid component (d).
3. The components (c2) and (c3) (or (d2) and (d3)) and the component (d4) are allowed to come in contact with the mixture of the solid component (c) and the solid component (d).
4. The components (c2) and (c3) (or (d2) and (d3)) and the components (d4) and (d5) are allowed to come in contact with the mixture of the solid component (c) and the solid component (d).
5. The component (d5) is allowed to come in contact with the mixture of the solid component (c) and the solid component (d).
6. The component (d5) is allowed to come in contact with the mixture of the solid component (c) and the solid component (d). The component (c2) or (d2) is then allowed to come in contact with the resulting reaction product.
7. The components (c2) and (c3) (or (d2) and (d3)) and the component (d5) are allowed to come in contact with the mixture of the solid component (c) and the solid component (d).
8. The component (d5) is allowed to come in contact with the mixture of the solid component (c) and the solid component (d). The components (c2) and (c3) (or (d2) and (d3)) are then allowed to come in contact with the resulting reaction product.

The conditions (e.g., temperature, time, weight ratio to the mixture) under which each component is allowed to come in contact with the mixture of the solid component (c) and the solid component (d) are arbitrary and not specifically limited. The same conditions as used in the preparation of the solid component (c) or (d) may be employed.

A specific example of the process which comprises allowing the components to come in contact with the mixture of the solid component (c) and the solid component (d) to prepare the solid catalyst component (A2) will be given below.

The solid component (c) and the solid component (d) are suspended in an aromatic hydrocarbon such as toluene within a temperature range of from −10° C. to 30° C. in such an amount that the weight ratio (c):(d) is from 1:99 to 99:1. To the suspension is added-titanium tetrachloride as the component (c2) (or (d2)). The amount of titanium tetrachloride to be used in this process is preferably not more than ½ by volume of the solvent in which the solid component (c) and the solid component (d) are suspended. The suspension is heated to a temperature of from 90° C. to 120° C. where it is then kept for 30 minutes to 3 hours to obtain a solid reaction product. Finally, the solid reaction product is washed with heptane to obtain a solid catalyst component (A2).

[Preparation of catalyst for polymerization of olefins and polymerization using same]

The solid catalyst components (A1) and (A2) of the present invention thus obtained are each used as a polymerization catalyst in combination with the following components (B) and (C) in the polymerization reaction of olefins.

As the organic aluminum compound (B) to be used in the preparation of the catalyst for polymerization of olefins of the present invention there may be used an organic aluminum compound represented by the general formula [XI]:

$$R^{11}{}_q AlQ_{3-q} \qquad [XI]$$

wherein $R^{11}$ represents a $C_{1-4}$ alkyl group; Q represents a hydrogen, chlorine, bromine or iodine atom; and q represents a real number of from more than 0 to not more than 3. Examples of the organic aluminum compound (B) include triethyl aluminum, diethyl aluminum chloride, tri-iso-butyl. aluminum, diethyl aluminum bromide, ethyl aluminum sesquichloride, and ethyl aluminum hydride. These organic aluminum compounds may be used singly or in combination. Preferred among these organic aluminum compounds are triethyl aluminum, and tri-iso-butyl aluminum.

As the organic silicon compound to be used for the preparation of the catalyst for polymerization of olefins of the present invention there may be used an organic silicon compound represented by the following general formula [XII]:

$$R^{12}{}_r Si(OR^{13})_{4-r} \qquad [XII]$$

wherein $R^{12}$ may be the same or different and represents a $C_{1-12}$ alkyl, cycloalkyl, phenyl, vinyl, allyl or aralkyl group; $R^{13}$ may be the same or different and represents a $C_{1-4}$ alkyl, cycloalkyl, phenyl, vinyl, allyl or aralkyl group; and r represents 0 or an integer of from 1 to 3. Examples of the organic silicon compound (C) include phenylalkoxysilane, alkylalkoxysilane, phenylalkylalkoxysilane, cycloalkylakoxysilane, cycloalkylalkylalkoxysilane, and alkoxysilane.

Specific examples of the foregoing component (C) include trimethylmethoxysilane, trimethylethoxysilane, tri-n-propylmethoxysilane, tri-n-propylethoxysilane, tri-n-butylmethoxysilane, tri-iso-butylmethoxysilane, tri-t-butylmethoxysilane, tri-n-butylethoxysilane, tricyclohexylmethoxysilane, tricyclohexylethoxysilane, dimethyldimethoxysilane, dimethyldiethoxysilane, di-n-propyldimethoxysilane, di-iso-propyldimethoxysilane, di-n-propyldiethoxysilane, di-iso-propyldiethoxysilane, di-n-butyldimethoxysilane, di-iso-butyldimethoxysilane, di-t-butyldimethoxysilane, di-n-butyldiethoxysilane, n-butylmethyldimethoxysilane, bis(2-ethylhexyl)dimethoxysilane, bis(2-ethylhexyl)diethoxysilane, dicyclohexyldimethoxysilane, dicyclohexyldiethoxysilane, dicyclopentyldimethoxysilane, dicyclopentyldiethoxysilane, cyclohexylmethyldimethoxysilane, cyclohexylmethyldiethoxysilane, cyclohexylethyldimethoxysilane, cyclohexyl(iso-propyl)dimethoxysilane, cyclohexylethyldiethoxysilane, cyclopentylmethyldimethoxysilane, cyclopentylmethyldiethoxysilane, cyclopentylethyldiethoxysilane, cyclopentyl(iso-propyl)dimethoxysilane, cyclohexyl(n-pentyl)dimethoxysilane, cyclohexyl(n-pentyl)diethoxysilane, cyclopentyl(iso-butyl)dimethoxysilane, cyclohexyl(n-propyl)dimethoxysilane, cyclohexyl(n-propyl)diethoxysilane, cyclohexyl(n-butyl)dimethoxysilane, cyclohexyl(n-butyl)diethoxysilane, cyclohexyl(iso-butyl)dimethoxysilane, diphenyldimethoxysilane, diphenyldiethoxysilane, phenylmethyldimethoxysilane, phenylmethyldiethoxysilane, phenylethyldimethoxysilane, phenylethyldiethoxysilane, cyclohexyldimethylmethoxysilane, cyclohexyldimethylethoxysilane, cyclohexyldiethylmethoxysilane, cyclohexyldiethylethoxysilane, 2-ethylhexyltrimethoxysilane, 2-ethylhexyltriethoxysilane, methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, n-butyltrimethoxysilane, iso-butyltrimethoxysilane, t-butyltrimethoxysilane, n-butyltriethoxysilane, cyclohexyltrimethoxysilane, cyclohexyltriethoxysilane, cyclopentyltrimethoxysilane, cyclopentyltriethoxysilane, vinyltrimethoxysilane, vinyltriethoxysilane, 2-ethylhexyltrimethoxysilane, 2-ethylhexyltriethoxysilane, phenyltrimethoxysilane, phenyltriethoxysilane, tetramethoxysilane, tetraethoxysilane, cyclohexylcyclopentyldimethoxysilane, cyclohexylcyclopentyldiethoxysilane, cyclohexylcyclopentyldipropoxysilane, 3-methylcyclohexylcyclopentyldimethoxysilane, 4-methylcyclohexylcyclopentyldimethoxysilane, 3,5-dimethylcyclohexylcyclopentyldimethoxysilane, 3-methylcyclohexylcyclohexyldimethoxysilane, bis(3-methylcyclohexyl)dimethoxysilane, 4-methylcyclohexylcyclohexyldimethoxysilane, bis(4-methylcyclohexyl)dimethoxysilane, 3,5-dimethylcyclohexylcyclohexyldimethoxysilane, and bis(3, 5-dimethylcyclohexyl)dimethoxysilane.

Preferred among these organic silicon compounds are di-n-propyldimethoxysilane, di-iso-propyldimethoxysilane, di-n-butyldimethoxysilane, di-iso-butyldimethoxysilane, di-t-butyldimethoxysilane, di-n-butyldiethoxysilane, t-butyltrimethoxysilane, dicyclohexyldimethoxysilane, dicyclohexyldiethoxysilane, cyclohexylethyldimethoxysilane, cyclohexylmethyldiethoxysilane, cyclohexylethyldiethoxysilane, cyclohexylethyldiethoxysilane, dicyclopentyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane, and 3,5-dimethylcyclohexylcyclopentyldimethoxysilane. These organic silicon compounds (C) may be used singly or in combination.

The polymerization of olefins is accomplished by the polymerization or copolymerization of olefins in the presence of a catalyst made of the foregoing solid catalyst component (A1) or (A2), organic aluminum compound (B) and organic silicon compound (C). The ratio of the components to be used is arbitrary and not specifically limited unless the effects of the present invention are impaired. In general, the proportion of the organic aluminum compound (B) is from 1 to 1,000 mols, preferably from 50 to 500 mols per mol of titanium atom in the solid catalyst component (A1) or (A2). The proportion of the organic silicon compound (C) is from 0.020 to 2 mols, preferably from 0.01 to 0.5 mols per mol of the component (B).

The catalyst for polymerization of olefins of the present invention is formed by the solid catalyst component (A1) or (A2), organic aluminum compound (B) and organic silicon compound (C). As the electron donor (external electron donor) to be used during polymerization there may be used an organic compound containing oxygen or nitrogen in combination with the foregoing organic silicon compound (C). Specific examples of such an organic compound include alcohols, phenols, ethers, esters, ketones, acid halides, aldehydes, amines, amides, nitriles, and isocyanates.

Specific examples of these organic compounds include alcohols such as methanol, ethanol, propanol, butanol, pentanol, hexanol, octanol, 2-ethylhexanol and dodecanol, phenols such as phenol and cresol, ethers such as methyl ether, ethyl ether, propyl ether, butyl ether, amyl ether and diphenyl ether, monocarboxylic acid esters such as methyl formate, ethyl acetate, vinyl acetate, propyl acetate, octyl acetate, cyclohexyl acetate, ethyl propionate, ethyl butyrate, methyl benzoate, ethyl benzoate, propyl benzoate, butyl benzoate, octyl benzoate, cyclohexyl benzoate, phenyl benzoate, methyl p-toluylate, ethyl p-toluylate, p-methoxyethyl benzoate, p-ethoxyethyl benzoate, ethyl anisate and ethyl anisate, dicarboxylic acid esters such as diethyl maleate, dibutyl maleate, dimethyl adipate, diethyl adipate, dipropyl adipate, dibutyl adipate, diisodecyl adipate, dioctyl adipate, dimethyl phthalate, diethyl phthalate, dipropyl phthalate, dibutyl phthalate, dipentyl phthalate, dihexyl phthalate, diheptyl phthalate, dioctyl phthalate, dinonyl phthalate and didecyl phthalate, ketones such as acetone, methyl ethyl ketone, methyl butyl ketone, acetophenone and benzophenone, acid halides such as phthalic acid dichloride and terephthalic acid dichloride, aldehydes such as acetaldehyde, propionaldehyde and octylaldehyde, amines such as methylamine, ethylamine, tributylamine, piperidine, aniline and pyridine, amides such as acetamide and acrylamide, nitriles such as acetonitrile, benzonitrile and tolunitrile, and isocyanates such as phenyl isocyanate and n-butyl isocyanate.

Examples of the olefins to be homopolymerized or copolymerized in the presence of the catalyst of the present invention include ethylene, propylene, 1-butene, and 4-methyl-1-pentene. The catalyst of the present invention is particularly suitable for the homopolymerization of propylene or the copolymerization of propylene with ethylene.

The polymerization of olefins in the presence of the catalyst made of the foregoing solid catalyst component (A1) or (A2), organic aluminum compound (B) and organic silicon compound (C) is preferably preceded by prepolymerization to further enhance the catalytic activity and the stereo-regularity and particle properties of the polymer thus produced. As the monomers to be used in the prepolymerization there may be used ethylene and propylene as well as monomers such as styrene and vinyl cyclohexane.

The polymerization is carried out by slurry polymerization, bulk polymerization or gas phase polymerization. During the polymerization, hydrogen may be used as a controlling agent of molecular weight. The polymerization temperature is not higher than 200° C., preferably not higher than 100° C. The polymerization pressure is not higher than 10 MPa, preferably not higher than 5 MPa, more preferably not higher than 2.5 MPa.

The polymerization of olefins, in particular propylene, in the presence of the catalyst of the present invention allows the stable and high yield production of a polymer having the desired stereoregularity or crystallinity without changing the polymerization parameter. Further, the use of the catalyst of the present invention allows extremely easy control over the crystallinity of the polymer thus produced. Moreover, the use of the catalyst of the present invention allows the production of a polymer having a higher bulk density and a less content of fine powder while maintaining the high polymerization activity and the high yield of high stereoregularity polymer. Further, the use of the catalyst comprising the solid catalyst component (A2) in the slurry polymerization of propylene makes it possible to obtain a stereoregular polymer with a low percent occurrence of atactic polypropylene in a high yield even if a polymer having a relatively low crystallinity is produced.

A continuous process for the preparation of the foregoing solid catalyst components (A1) and (A2), and the catalyst for polymerization of olefins made of these solid catalyst components and the organic metal compounds (B) and (C) is shown in FIGS. 1 and 2. FIG. 1 illustrates the preparation process using the solid catalyst component (A1). FIG. 2 illustrates the preparation process using the solid catalyst component (A2).

The present invention will be further described in the following examples, but the present invention should not be construed as being limited thereto.

EXAMPLE 1

[Preparation of solid catalyst component (A1)]
(1) Preparation of solid component (a)

Into a 500-ml round flask equipped with an agitator in which the air within had been thoroughly replaced by nitrogen gas were charged 10 g of diethoxymagnesium and 80 ml of toluene to make a suspension. Into the flask was then charged 20 ml of titanium tetrachloride at room temperature. The reaction system was heated with stirring to a temperature of 90° C. where it was then reacted. Subsequently, to the reaction mixture was added 2.7 ml of di-iso-octyl phthalate. The reaction system was further heated to a temperature of 110° C. where it was then reacted for 2 hours. After the termination of the reaction, the supernatant solution was removed. The resulting solid reaction product was then washed with 100 ml of toluene three times. Thereafter, to the solid reaction product were added 80 ml of toluene and 20 ml of titanium tetrachloride. The mixture was then reacted with stirring at a temperature of 100° C. for 2 hours. Subsequently, the resulting solid product was washed with 100 ml of n-heptane of 40° C. 8 times. The resulting solid matter was then dried under reduced pressure to obtain a solid component (a). The solid component was then measured for Ti content. The results were 2.5% by weight.

(2) Preparation of solid component (b)

Into a 500-ml round flask equipped with an agitator in which the air within had been thoroughly replaced by nitrogen gas were charged 10 g of diethoxymagnesium and 80 ml of toluene to make a suspension. Into the flask was then charged 20 ml of titanium tetrachloride at room temperature. The reaction system was heated with stirring to a temperature of 50° C. where it was then reacted. Subsequently, to the reaction mixture was added 5.2 ml of di-iso-octyl phthalate. The reaction system was further heated to a temperature of 70° C. where 0.2 ml of diethyl phthalate was then added thereto. Subsequently, to the mixture was added 4.0 ml of a dimethylpolysiloxane which exhibits a viscosity of 100 cSt at room temperature. The reaction system was further heated to a temperature of 112° C. where it was then reacted for 1.5 hours. After the termination of the reaction, the supernatant solution was removed. Into the flask were then charged 80 ml of toluene and 20 ml of titanium tetrachloride. The mixture was then processed at a temperature of 110° C. for 15 minutes. The supernatant solution was then removed. The resulting solid reaction product was then washed with 100 ml of toluene three times. Thereafter, to the reaction product were added 80 ml of toluene and 20 ml of titanium tetrachloride. The reaction mixture was then reacted with stirring at a temperature of 100° C. for 2 hours. Thereafter, the reaction product was washed with 100 ml of n-heptane of 40° C. 8 times. The resulting solid matter was then dried under reduced pressure to obtain a solid component (b). The solid component was then measured for Ti content. The results were 2.7% by weight.

(3) Mixing of solid component (a) and solid component (b)

Into a 100-ml round flask equipped with an agitator in which the air within had been thoroughly replaced by nitrogen gas were charged 10 g of the solid component (a) obtained above and 10 g of the solid component (b) obtained above (weight ratio: 50:50). The mixture was then stirred at room temperature for 15 minutes to obtain a solid catalyst component (A1). The solid catalyst component thus obtained exhibited a Ti content of 2.6% by weight.

[Preparation of polymerization catalyst and polymerization]

Into a 2 l autoclave equipped with an agitator in which the air within had been completely replaced by nitrogen gas were charged 1.32 mmol of triethyl aluminum, 0.13 mmol of cyclohexylmethyldimethoxysilane and the foregoing solid catalyst component (A1) in an amount of 0.0033 mmol as calculated in terms of titanium atom to form a polymerization catalyst. Into the autoclave were then charged 1.5 l of hydrogen gas and 1.4 l of liquid propylene. The mixture was then allowed to undergo polymerization reaction at a temperature of 70° C. for 1 hour. The properties of the catalyst thus obtained and the polymer obtained by the polymerization in the presence of the catalyst are set forth in Table 1. The xylene-soluble content (XS), melt index (MI) and bulk density (BD) of the polymer thus produced are also set forth in Table 1. The properties of the polymer set forth in Table 1 had been determined as follows. In some detail, after the termination of the polymerization reaction, the polymer thus produced was measured for weight (x). The polymer was then extracted with boiling n-heptane for 6 hours. The resulting undissolved polymer was then measured for weight (y). The polymerization activity (Y) and the yield (HI) of the entire crystalline polymer were determined by the following equations (F) and (G):

$$\text{Polymerization activity } (Y) = \frac{(x)\,(g)}{\text{Solid catalyst component }(g)} \quad (F)$$

$$\text{Yield } (HI) \text{ of entire crystalline polymer} = \frac{(y)}{(x)} \times 100\ (\%) \quad (G)$$

EXAMPLES 2–5

The experiment procedure of Example 1 was followed except that the solid component (a) and the solid component (b) were mixed in the weight ratio set forth in Table 1 within the range of from 90:10 to 10:90. The results are set forth in Table 1.

EXAMPLE 6

[Preparation of solid catalyst component (A1)]

(1) Preparation of solid component (a)

Into a 500-ml round flask equipped with an agitator in which the air within had been thoroughly replaced by nitrogen gas were charged 10 g of diethoxymagnesium and 80 ml of toluene to make a suspension. Into the flask was then charged 20 ml of titanium tetrachloride at room temperature. The reaction system was heated with stirring to a temperature of 90° C. where it was then reacted. Subsequently, to the reaction mixture was added 2.7 ml of di-n-butyl phthalate. The reaction system was further heated to a temperature of 110° C. where it was then reacted for 2 hours. After the termination of the reaction, the supernatant solution was removed. The resulting solid reaction product was then washed with 100 ml of toluene three times to obtain a solid component (a).

(2) Preparation of solid component (b)

Into a 500-ml round flask equipped with an agitator in which the air within had been thoroughly replaced by nitrogen gas were charged 10 g of diethoxymagnesium and 80 ml of toluene to make a suspension. Into the flask was then charged 20 ml of titanium tetrachloride at room temperature. The reaction system was heated with stirring to a temperature of 50° C. where it was then reacted. Subsequently, to the reaction mixture was added 5.2 ml of di-iso-octyl phthalate. The reaction system was further heated to a temperature of 70° C. where 0.2 ml of diethyl phthalate was then added thereto. Subsequently, to the mixture was added 4.0 ml of a dimethyl polysiloxane which exhibits a viscosity of 100 cSt at room temperature. The reaction system was further heated to a temperature of 112° C. where it was then reacted for 1.5 hours. After the termination of the reaction, the supernatant solution was removed. The resulting solid reaction product was then washed with 100 ml of toluene three times to obtain a solid component (b).

(3) Mixing of solid component (a) and solid component (b)

Into a 100-ml round flask equipped with an agitator in which the air within had been thoroughly replaced by nitrogen gas were charged the solid component (a) obtained above and the solid component (b) obtained above in an amount of 10 g each as calculated in terms of net solid weight (weight ratio: 50:50). Into the flask was then charged 160 ml of toluene to make a suspension. Subsequently, the reaction system was heated to a temperature of 100° C. where it was then reacted for 1.5 hours. Thereafter, the resulting solid reaction product was washed with 100 ml of n-heptane of 40° C. 8 times. The resulting solid matter was then dried under reduced pressure to obtain a solid catalyst component (A1). The solid component thus obtained was then measured for Ti content. The results were 2.8% by weight.

[Preparation of polymerization catalyst and polymerization]
The experiment procedure of Example 1 was followed. The results are set forth in Table 1.

TABLE 1

| Example No. | Weight ratio of solid component (c) to solid component (d) [(c):(d)] | Polymerization activity (Y) (g/g – cat.) | % Yield (HI) of entire crystalline polymer | Xylene-soluble content (XS) (%) | Melt index (MI) (g/10 min.) | Bulk density (BD) (g/ml) |
|---|---|---|---|---|---|---|
| 1 | 50:50 | 59,500 | 98.6 | 3.3 | 3.7 | 0.45 |
| 2 | 90:10 | 60,300 | 98.5 | 1.9 | 3.1 | 0.44 |
| 3 | 75:25 | 65,500 | 98.2 | 2.6 | 3.5 | 0.45 |
| 4 | 25:75 | 70,200 | 96.0 | 5.0 | 3.3 | 0.44 |
| 5 | 10:90 | 69,000 | 95.5 | 5.9 | 3.9 | 0.43 |
| 6 | 50:50 | 63,500 | 98.3 | 3.1 | 3.0 | 0.44 |

EXAMPLE 7

[Preparation of solid catalyst component (A1)]

(1) Preparation of solid catalyst component (a)

Into a 500-ml round flask equipped with an agitator in which the air within had been thoroughly replaced by nitrogen gas were charged 20 ml of titanium tetrachloride and 30 ml of toluene to make a mixed solution. To the mixed solution was then added at 10° C. a suspension prepared from 10 g of diethoxymagnesium having a bulk density of 0.29 g/ml and a sphericity (l/W) of 1.10 and 50 ml of toluene. To the mixture was then added 3.6 ml of di-iso-octyl phthalate at a temperature of 10° C. The mixture was heated to a temperature of 110° C. where it was then reacted with stirring for 2 hours. After the termination of the reaction, the resulting reaction product was washed with 100 ml of toluene of 80° C. four times. To the reaction product were added 40 ml of titanium tetrachloride and 60 ml of toluene. The reaction system was heated to a temperature of 110° C. where it was then reacted with stirring for 2 hours. After the termination of the reaction, the resulting reaction product was washed with n-heptane of 40° C. 10 times to obtain a solid component (a). The solid component (a) was then measured for titanium content. The results were 3.1% by weight.

(2) Preparation of solid component (b)

Into a 500-ml round flask equipped with an agitator in which the air within had been thoroughly replaced by nitrogen gas were charged 10 g of diethoxymagnesium having a bulk density of 0.29 g/ml and a sphericity (l/W) of 1.10 and 90 ml of toluene to make a suspension which was then cooled to a temperature of 3° C. The suspension was then added a mixture of 30 ml of toluene and 20 ml of titanium tetrachloride. To the suspension was then added 3.6 ml of di-n-butyl phthalate while the temperature thereof was kept to 3° C. The suspension was heated to a temperature of 10° C. where 3 ml of decamethylcyclopentasiloxane was then added thereto. The resulting solid reaction product was heated to a temperature of 110° C. where it was then reacted for 2 hours. After the termination of the reaction, the supernatant solution was removed. The resulting solid reaction product was then washed with 100 ml of toluene at 110° C. four times. Thereafter, to the reaction product were added 80 ml of toluene and 20 ml of titanium tetrachloride. The mixture was processed at a temperature of 110° C. with stirring for 2 hours, and then washed with 100 ml of 40° C. n-heptane 8 times to obtain a solid component (b). The solid component (b) was then measured for titanium content. The results were 1.9% by weight.

(3) Mixing of solid component (a) and solid component (b)

Into a 100-ml round flask equipped with an agitator in which the air within had been thoroughly replaced by nitrogen gas were charged 10 g of the solid component (a) obtained above and 10 g of the solid component (b) obtained above. The mixture was then stirred at room temperature for 15 minutes to obtain a solid catalyst component (A1). The solid catalyst component (A1) was then measured for titanium content. The results were 2.5% by weight.

[Preparation of polymerization catalyst and polymerization]

The experiment procedure of Example 1 was followed. The results are set forth in Table 2.

EXAMPLES 8–11

The experiment procedure of Example 1 was followed except that the mixing ratio of the solid component (a) and the solid component (b) was changed as set forth in Table 2. The results are set forth in Table 2.

TABLE 2

| Example No. | Weight ratio of solid component (a) to solid component (b) [(a):(b)] | Polymerization activity (Y) (g/g – cat.) | % Yield (HI) of entire crystalline polymer | Xylene-soluble content (XS) (%) | Melt index (MI) (g/10 min.) | Bulk density (BD) (g/ml) |
|---|---|---|---|---|---|---|
| 7 | 50:50 | 53,400 | 98.0 | 2.5 | 2.9 | 0.46 |
| 8 | 90:10 | 61,900 | 98.9 | 1.5 | 3.5 | 0.47 |
| 9 | 75:25 | 59,500 | 98.5 | 2.1 | 2.8 | 0.45 |
| 10 | 25:75 | 66,800 | 97.7 | 2.9 | 3.2 | 0.47 |
| 11 | 10:90 | 68,100 | 97.2 | 3.5 | 3.7 | 0.47 |

EXAMPLE 12

[Preparation of solid catalyst component (A2)]

(1) Preparation of solid component (c)

Into a 500-ml round flask equipped with an agitator in which the air within had been thoroughly replaced by nitrogen gas were charged 10 g of diethoxymagnesium and 80 ml of toluene to make a suspension. Into the flask was then charged 20 ml of titanium tetrachloride at room temperature. The reaction system was heated with stirring to a temperature of 90° C. where 2.7 ml of di-n-butyl phthalate was then added thereto. The reaction system was heated to a temperature of 110° C. where it was then reacted for 2 hours. After the termination of the reaction, the supernatant solution was removed. The resulting solid reaction product was then washed with 100 ml of toluene three times. Thereafter, to the reaction product were added 80 ml of toluene and 20 ml of titanium tetrachloride. The mixture was then reacted with stirring at a temperature of 100° C. for 2 hours. Subsequently, the reaction product was washed with 100 ml of n-heptane of 40° C. 8 times. The resulting solid matter was then dried under reduced pressure to obtain a solid component (c). The solid component was then measured for Ti content. The results were 2.5% by weight.

(2) Preparation of solid component (d)

Into a 500-ml round flask equipped with an agitator in which the air within had been thoroughly replaced by nitrogen gas were charged 10 g of diethoxymagnesium and 80 ml of toluene to make a suspension. Into the flask was then charged 20 ml of titanium tetrachloride at room temperature. The reaction system was heated with stirring to a temperature of 50° C. where it was then reacted. Subsequently, to the reaction mixture was added 5.2 ml of di-iso-octyl phthalate. The reaction system was further heated to a temperature of 70° C. where 0.2 ml of diethyl phthalate was then added thereto. Subsequently, to the mixture was added 4.0 ml of a dimethyl polysiloxane which exhibits a viscosity of 100 cSt at room temperature. The reaction system was further heated to a temperature of 112° C. where it was then reacted for 1.5 hours. After the termination of the reaction, the supernatant solution was removed. Into the flask were then charged 80 ml of toluene and 20 ml of titanium tetrachloride. The mixture was then processed at a temperature of 110° C. for 15 minutes. The supernatant solution was then removed. The resulting solid reaction product was then washed with 100 ml of toluene three times. Thereafter, to the reaction product were added a solution of 0.8 g of aluminum trichloride in 80 ml of toluene and 20 ml of titanium tetrachloride. The mixture was then reacted with stirring at a temperature of 100° C. for 2 hours. Thereafter, the resulting solid reaction product was washed with 100 ml of n-heptane of 40° C. 8 times. The resulting solid matter was then dried under reduced pressure to obtain a solid component (d). The solid component was-then measured for Ti content. The results were 2.1% by weight. The aluminum content of the solid component was 1.6% by weight.

(3) Mixing of solid component (c) and solid component (d)

Into a 100-ml round flask equipped with an agitator in which the air within had been thoroughly replaced by nitrogen gas were charged 10 g of the solid component (c) obtained above and 10 g of the solid component (d) obtained above (weight ratio: 50:50). The mixture was then stirred at room temperature for 15 minutes to obtain a solid catalyst component (A2). The solid catalyst component thus obtained exhibited a Ti content of 2.3% by weight and an Al content of 0.8% by weight.

[Preparation of polymerization catalyst and polymerization]

Into a 2 l autoclave equipped with an agitator in which the air within had been completely replaced by nitrogen gas were charged 1.32 mmol of triethyl aluminum, 0.13 mmol of cyclohexylmethyldimethoxysilane and the foregoing solid catalyst component (A2) in an amount of 0.0033 mmol as calculated in terms of titanium atom to form a polymerization catalyst. Into the autoclave were then charged 1.5 l of hydrogen gas and 1.4 l of liquid propylene. The mixture was then allowed to undergo polymerization reaction at a temperature of 70° C. for 1 hour. The properties of the catalyst thus obtained and the polymer obtained by the polymerization in the presence of the catalyst are set forth in Table 3. The xylene-soluble content (XS), melt index (MI) and bulk density (BD) of the polymer thus produced are also set forth in Table 3. The properties of the polymer set forth in Table 3 had been determined as follows. In some detail, after the termination of the polymerization reaction, the polymer thus produced was measured for weight (x). The polymer was then extracted with boiling n-heptane for 6 hours. The resulting undissolved polymer was then measured for weight (y). The polymerization activity (Y) and the yield (HI) of the entire crystalline polymer were determined by the foregoing equations (F) and (G).

EXAMPLES 13–16

The experiment procedure of Example 12 was followed except that the solid component (c) and the solid component (d) were mixed in the weight ratio set forth in Table 3 within the range of from 90:10 to 10:90. The results are set forth in Table 3.

EXAMPLE 17

[Preparation of solid catalyst component (A2)]

(1) Preparation of solid component (c)

Into a 500-ml round flask equipped with an agitator in which the air within had been thoroughly replaced by nitrogen gas were charged 10 g of diethoxymagnesium and 80 ml of toluene to make a suspension. Into the flask was then charged 20 ml of titanium tetrachloride at room temperature. The reaction system was heated with stirring to a temperature of 90° C. where it was then reacted. Subsequently, to the reaction mixture was added 2.7 ml of di-n-butyl phthalate. The reaction system was further heated to a temperature of 110° C. where it was then reacted for 2 hours. After the termination of the reaction, the supernatant solution was removed. The resulting solid reaction product was then washed with 100 ml of toluene three times to obtain a solid component (c).

(2) Preparation of solid component (d)

Into a 500-ml round flask equipped with an agitator in which the air within had been thoroughly replaced by nitrogen gas were charged 10 g of diethoxymagnesium, 1.5 g of aluminum trichloride and 80 ml of toluene to make a suspension. Into the flask was then charged 20 ml of titanium tetrachloride at room temperature. The reaction system was heated with stirring to a temperature of 50° C. where it was then reacted. Subsequently, to the reaction mixture was added 5.2 ml of di-iso-octyl phthalate. The reaction system was further heated to a temperature of 70° C. where 0.2 ml of diethyl phthalate was then added thereto. Subsequently, to the mixture was added 4.0 ml of a dimethylpolysiloxane which exhibits a viscosity of 100 cSt at room temperature. The reaction system was further heated to a temperature of 112° C. where it was then reacted for 1.5 hours. After the termination of the reaction, the supernatant solution was removed. The resulting solid reaction product was then washed with 100 ml of toluene three times to obtain a solid component (d).

(3) Mixing of solid component (c) and solid component (d)

Into a 100-ml round flask equipped with an agitator in which the air within had been thoroughly replaced by nitrogen gas were charged the solid component (c) obtained above and the solid component (d) obtained above (weight ratio: 50:50) in an amount of 10 g each as calculated in terms of net solid weight. Into the flask was then charged 160 ml of toluene to make a suspension. Subsequently, the reaction system was heated to a temperature of 100° C. where it was then reacted for 1.5 hours. Thereafter, the resulting solid reaction product was washed with 100 ml of n-heptane of 40° C. 8 times. The resulting solid matter was then dried under reduced pressure to obtain a solid catalyst component (A2). The solid component thus obtained was then measured for Ti content. The results were 2.6% by weight. The solid component also exhibited an aluminum content of 0.4% by weight.

[Preparation of polymerization catalyst and polymerization]

The experiment procedure of Example 12 was followed. The results are set forth in Table 3.

the yield (t-II) of the entire crystalline polymer were determined by the following equations:

Polymerization activity (Y)=[(J)+(K)](g)/weight (g) of solid catalyst component

Percent occurrence of atactic polypropylene (APP)=(J) (g)/[(J)+(K)](g)

Yield (t-II) of entire crystalline polymer=(L)(g)/[(J)+(K)] (g)

The solid polymer thus produced was further measured for density (ρ), melt index (MI) and bulk density (BD). The results are set forth in Table 4.

TABLE 3

| Example No. | Weight ratio of solid component (a) to solid component (b) [(a):(b)] | Polymerization activity (Y) (g/g – cat.) | % Yield (HI) of entire crystalline polymer | Xylene-soluble content (XS) (%) | Melt index (MI) (g/10 min.) | Bulk density (BD) (g/ml) |
|---|---|---|---|---|---|---|
| 12 | 50:50 | 57,700 | 96.8 | 3.8 | 3.5 | 0.43 |
| 13 | 90:10 | 56,600 | 98.5 | 2.0 | 3.0 | 0.44 |
| 14 | 75:25 | 59,300 | 98.2 | 2.5 | 3.2 | 0.43 |
| 15 | 25:75 | 71,500 | 95.4 | 5.2 | 3.7 | 0.43 |
| 16 | 10:90 | 72,800 | 94.3 | 6.2 | 3.7 | 0.43 |
| 17 | 50:50 | 58,500 | 97.3 | 3.0 | 3.2 | 0.44 |

EXAMPLE 18

A slurry polymerization was effected in the solid catalyst component obtained in Example 15 in the following manner. Into a 1,800 ml stainless steel autoclave equipped with an agitator the interior of which had been dried with nitrogen gas and in which the nitrogen gas within had been thoroughly replaced by propylene gas was charged 700 ml of n-heptane. Into the autoclave were then charged 2.10 mmol of triethylaluminum, 0.21 mmol of cyclohexylmethyldimethoxysilane and the foregoing solid catalyst component in an amount of 0.0053 mmol as calculated in terms of titanium atom while the reaction system was kept in an atmosphere of propylene gas to form a polymerization catalyst. The mixture was then subjected to prepolymerization at a temperature of 20° C. with stirring under a propylene pressure of 0.2 MPa for 30 minutes. Thereafter, into the autoclave was charged 80 ml of hydrogen. The mixture was further subjected to polymerization at a temperature of 70° C. under a propylene pressure of 0.7 MPa for 2 hours. The pressure drop caused by the progress of the polymerization was compensated for by the continuous supply of propylene alone to keep the system pressure constant during the polymerization. In accordance with the foregoing polymerization process, a propylene was polymerized. The polymer thus produced was withdrawn by filtration, and then dried under reduced pressure to obtain a solid polymer. The catalytic properties and the properties of the polymer thus obtained are set forth in Table 4.

The catalytic properties and the properties of the polymer set forth in Table 4 had been determined as follows. After the termination of the polymerization reaction, the polymer thus produced was withdrawn by filtration. The resulting filtrate was condensed to obtain a polymer soluble in a polymerization solvent which was then measured for weight (J). The solid polymer, too, was then measured for weight (K). The solid polymer thus obtained was extracted with boiling n-heptane for 6 hours to obtain a polymer insoluble in n-heptane which was then measured for weight (L). The polymerization activity (Y) per solid catalyst component, the percent occurrence of atactic polypropylene (APP) and

TABLE 4

| Properties evaluated | Example 18 |
|---|---|
| Polymerization activity (Y) (g/g-cat.) | 21,400 |
| Percent occurrence of atactic polypropylene (APP) | 0.9 |
| % Yield (t-II) of entire crystalline polymer | 96.0 |
| Density (ρ) | 0.9052 |
| Melt index (MI) (g/10 min.) | 3.4 |
| Bulk density (BD) (g/ml) | 0.40 |

INDUSTRIAL APPLICABILITY

The catalyst according to the present invention can exhibit a sufficiently high catalytic activity when used in the polymerization of olefins, in particular propylene. As a result, the content of catalyst residue in the polymer thus produced can be minimized, making it possible to reduce the content of chlorine remaining in the polymer thus produced to such an extent that no deashing process is required. Further, the crystallinity of the stereoregular polypropylene thus produced can be invariably controlled without drastically changing the process parameter during the polymerization reaction, allowing easy production of a resin adapted for film or sheet. Moreover, if polymerization is effected in the presence of the catalyst according to the present invention, the content of fine powder in the polymer thus produced can be reduced, making it possible to prevent any process troubles due to fine polymer powder.

In addition, the use of the catalyst according to the present invention makes it possible to minimize the percent occurrence of atactic polypropylene in the polymerization solvent during slurry polymerization process, lessening the load on the polymer post-treatment process or polymerization solvent purification process and hence giving a great contribution to the energy saving, or the like resulting in the operation cost reduction.

On the other hand, the catalyst according to the present invention can fairly maintain its activity during polymerization and thus allows stabler process control.

Further, the process for the preparation of the catalyst according to the present invention is simple and requires no special additional facilities. Thus, a solid catalyst component with a stable quality can be obtained with a good reproducibility. Further, the preparation process is little liable to loss of solid starting material. Moreover, inexpensive materials can be used on an industrial basis. In addition, the preparation process is advantageous in that a high sedimentation speed can be attained during washing, making it possible to produce a solid catalyst component at a low cost.

We claim:

1. A solid catalyst component for polymerization of olefins, comprising in combination one or more solid components (a) defined in the following clause (1) and one or more solid components (b) defined in the following clause (2):

(1) a solid component (a) prepared as a reaction product from the following components (a1) to (a3):

(a1) One or more dialkoxymagnesiums or diaryloxymagnesiums represented by the general formula I:

$$Mg(OR^1)_2 \qquad\qquad I$$

wherein $R^1$ represents a $C_{1-4}$-alkyl or an aryl group;

(a2) One or more titanium compounds represented by the general formula II:

$$Ti(OR^2)_m X_{4-m} \qquad\qquad II$$

wherein $R^2$ represents a $C_{1-4}$-alkyl group; X represents a halogen atom; and m represents 0 or an integer of from 1 to 3; and (a3) One or more diesters of an aromatic dicarboxylic acid; and (2) a solid component (b) prepared as a reaction product from the following components (b1) to (b4):

(b1) One or more dialkoxymagnesiums or diaryloxymagnesiums represented by the general formula III:

$$Mg(OR^3)_2 \qquad\qquad III$$

wherein $R^3$ represents a $C_{1-4}$-alkyl or an aryl group;

(b2) One or more titanium compounds represented by the general formula IV:

$$Ti(OR^4)_m X_{4-m} \qquad\qquad IV$$

wherein $R^4$ represents a $C_{1-4}$-alkyl group; X represents a halogen atom; and m represents 0 or an integer of from 1 to 3;

(b3) One or more diesters of an aromatic dicarboxylic acid; and (b4) One or more polysiloxanes.

2. The solid catalyst component for polymerization of olefins as claimed in claim 1, wherein the weight ratio of solid component (a) to solid component (b) is from 1:99 to 99:1.

3. A catalyst for polymerization of olefins formed by the following components (A), (B) and (C):

(A) a solid catalyst component for polymerization of olefins as claimed in claim 1;

(B) an organic aluminum compound represented by the general formula XI:

$$R^{11}_q AlQ_{3-q} \qquad\qquad XI$$

wherein $R^{11}$ represents a $C_{1-4}$-alkyl group; Q represents a hydrogen atom or halogen atom; and q represents a real number of from more than 0 to not more than 3; and (C) an organic silicon compound represented by the general formula XII:

$$R^{12}_r Si(OR^{13})_{4-r} \qquad\qquad XII$$

wherein $R^{12}$ represents the same or different $C_{1-12}$-alkyl, cycloalkyl, phenyl, vinyl, allyl or aralkyl group; $R^{13}$ represents the same or different $C_{1-4}$-alkyl, cycloalkyl, phenyl, vinyl, allyl or aralkyl group; and r represents 0 or an integer of from 1 to 3.

4. A catalyst for polymerization of olefins formed by the following components (A), (B) and (C):

(A) a solid catalyst component for polymerization of olefins as claimed in claim 2;

(B) an organic aluminum compound represented by the general formula XI:

$$R^{11}_q AlQ_{3-q} \qquad\qquad XI$$

wherein $R^{11}$ represents a $C_{1-4}$ alkyl-group; Q represents a hydrogen atom or halogen atom; and q represents a real number of from more than 0 to not more than 3; and (C) an organic silicon compound represented by the general formula XII:

$$R^{12}_r Si(OR^{13})_{4-r} \qquad\qquad XII$$

wherein $R^{12}$ represents the same or different $C_{1-12}$-alkyl, cycloalkyl, phenyl, vinyl, allyl or aralkyl group; $R^{13}$ represents the same or different $C_{1-4}$ alkyl-cycloalkyl, phenyl, vinyl, allyl or aralkyl group; and r represents 0 or an integer of from 1 to 3.

5. A solid catalyst component for polymerization of olefins, comprising in combination one or more solid components (c) defined in the following clause (1) and one or more solid components (d) defined in the following clause (2):

(1) a solid component (c) prepared as a reaction product from the following components (c1) to (c3):

(c1) One or more dialkoxymagnesiums or diaryloxymagnesiums represented by the general formula V:

$$Mg(OR^5)_2 \qquad\qquad V$$

wherein $R^5$ represents a $C_{1-4}$-alkyl or an aryl group;

(c2) One or more titanium compounds represented by the general formula VI:

$$Ti(OR^6)_m X_{4-m} \qquad\qquad VI$$

wherein $R^6$ represents a $C_{1-4}$-alkyl group; X represents a halogen atom; and m represents 0 or an integer of from 1 to 3; and (c3) One or more diesters of an aromatic dicarboxylic acid; and (2) a solid component (d) prepared as a reaction product from the following components (d1) to (d5):

(d1) One or more dialkoxymagnesiums or diaryloxymagnesiums represented by the general formula VII:

$$Mg(OR^7)_2 \quad \text{VII}$$

wherein $R^7$ represents a $C_{1-4}$-alkyl or an aryl group;

(d2) One or more titanium compounds represented by the general formula VIII:

$$Ti(OR^8)_m X_{4-m} \quad \text{VIII}$$

wherein $R^8$ represents a $C_{1-4}$-alkyl group; X represents a halogen atom; and m represents 0 or an integer of from 1 to 3;

(d3) One or more diesters of an aromatic dicarboxylic acid;

(d4) One or more polysiloxanes; and (d5) One or more compounds selected from the group consisting of aluminum compounds represented by the general formula IX:

$$Al(OR^9)_n X_{3-n} \quad \text{IX}$$

wherein $R^9$ represents a $C_{1-4}$-alkyl or an aryl group; X represents a halogen atom; and n represents a real number of from at least 0 to not more than 3 and of the general formula X:

$$R^{10}_p AlQ_{3-p} \quad \text{X}$$

wherein $R^{10}$ represents a $C_{1-4}$-alkyl group; Q represents a hydrogen atom or halogen atom; and p represents a real number of from more than 0 to not more than 3.

6. The solid catalyst component for polymerization of olefins as claimed in claim 5, wherein the weight ratio of solid component (c) to solid component (d) is from 1:99 to 99:1.

7. A catalyst for polymerization of olefins formed by the following components (A), (B) and (C):

(A) a solid catalyst component for polymerization of olefins as claimed in claim 5;

(B) an organic aluminum compound represented by the general formula XI:

$$R^{11}_q AlQ_{3-q} \quad \text{XI}$$

wherein $R^{11}$ represents a $C_{1-4}$ alkyl-group; Q represents a hydrogen atom or halogen atom; and q represents a real number of from more than 0 to not more than 3; and (C) an organic silicon compound represented by the general formula XII:

$$R^{12}_r Si(OR^{13})_{4-r} \quad \text{XII}$$

wherein $R^{12}$ represents the same or different $C_{1-12}$-alkyl-cycloalkyl, phenyl, vinyl, allyl or aralkyl group; $R^{13}$ represents the same or different $C_{1-4}$ alkyl, cycloalkyl, phenyl, vinyl, allyl or aralkyl group; and r represents 0 or an integer of from 1 to 3.

8. A catalyst for polymerization of olefins formed by the following components (A), (B) and (C):

(A) a solid catalyst component for polymerization of olefins as claimed in claim 6;

(B) an organic aluminum compound represented by the general formula XI:

$$R^{11}_q AlQ^{3-q} \quad \text{XI}$$

wherein $R^{11}$ represents a $C_{1-4}$ alkyl-group; Q represents a hydrogen atom or halogen atom; and q represents a real number of from more than 0 to not more than 3; and (C) an organic silicon compound represented by the general formula XII:

$$R^{12}_r Si(OR^{13})_{4-r} \quad \text{XII}$$

wherein $R^{12}$ represents the same or different $C_{1-12}$-alkyl, cycloalkyl, phenyl, vinyl, allyl or aralkyl group; and r represents 0 or an integer of from 1 to 3.

* * * * *